(12) United States Patent
Sano

(10) Patent No.: US 7,158,682 B2
(45) Date of Patent: Jan. 2, 2007

(54) IMAGE PROCESSING APPARATUS, IMAGE RECORDING APPARATUS, IMAGE REPRODUCING APPARATUS, CAMERA SYSTEM, COMPUTER PROGRAM, AND STORAGE MEDIUM

(75) Inventor: Yutaka Sano, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 817 days.

(21) Appl. No.: 10/420,887

(22) Filed: Apr. 23, 2003

(65) Prior Publication Data

US 2003/0219162 A1    Nov. 27, 2003

(30) Foreign Application Priority Data

Apr. 26, 2002    (JP)    ............................. 2002-126423

(51) Int. Cl.
*G06K 9/36* (2006.01)
*G06K 9/46* (2006.01)

(52) U.S. Cl. .................. 382/236; 382/238; 382/248; 382/240; 382/250; 375/240.12; 375/240.16

(58) Field of Classification Search ................ 382/232, 382/233, 236, 238, 239, 240, 248, 250–251; 375/240.16, 240.12, 240.08, 240.23; 348/154, 348/208.4, 416.1, 431.1
See application file for complete search history.

(56) References Cited

U.S. PATENT DOCUMENTS

| | | | |
|---|---|---|---|
| 4,792,510 A | 12/1988 | Kumano et al. | |
| 5,998,842 A | 12/1999 | Sano | |
| 6,218,703 B1 | 4/2001 | Sano | |
| 6,449,392 B1* | 9/2002 | Divakaran et al. | 382/235 |
| 2002/0171566 A1* | 11/2002 | Huang et al. | 341/50 |
| 2002/0191698 A1* | 12/2002 | Lee et al. | 375/240.12 |

FOREIGN PATENT DOCUMENTS

JP    2001-309381    11/2001

OTHER PUBLICATIONS

U.S. Appl. No. 10/156,093, filed May 29, 2002, Sano et al.
U.S. Appl. No. 10/164,545, filed Jun. 10, 2002, Sano et al.
U.S. Appl. No. 10/247,497, filed Sep. 20, 2002, Sano et al.
U.S. Appl. No. 10/420,887, filed Apr. 23, 2003, Sano.

* cited by examiner

*Primary Examiner*—Matthew C. Bella
*Assistant Examiner*—Ali Bayat
(74) *Attorney, Agent, or Firm*—Oblon, Spivak, McClelland, Maier & Neustadt, P.C.

(57) ABSTRACT

An image processing apparatus includes an image compression device which performs a discrete wavelet transform of pixel values for each rectangular portion to produce wavelet coefficients, and performs a hierarchical compression coding of the wavelet coefficients for each rectangular portion so that a codestream is produced. A codestream transform device is provided to reduce an amount of code data in the codestream. The codestream transform device comprises a syntax analysis unit which analyzes header information of each rectangular portion in the codestream. A comparison unit determines a similarity of pixel values between a current frame and a preceding frame in the codestream based on a result of the analysis. A codestream generating unit deletes code data of a corresponding rectangular portion of the current frame when the similarity is larger than a given threshold value.

25 Claims, 19 Drawing Sheets

FIG.2
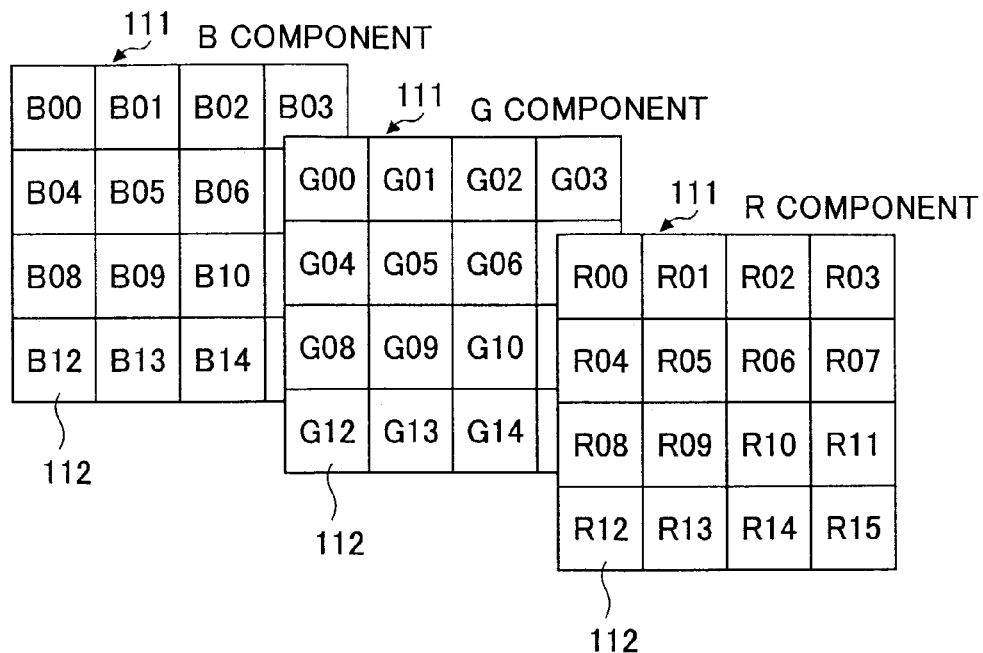
FIG.3
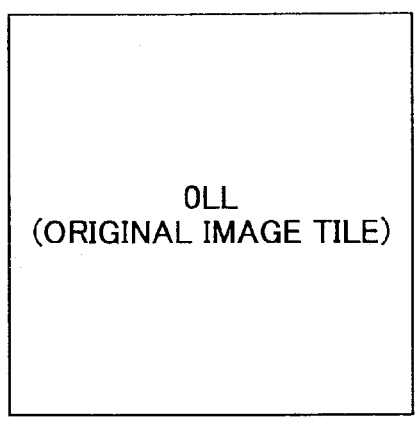
Decomposition Level 0
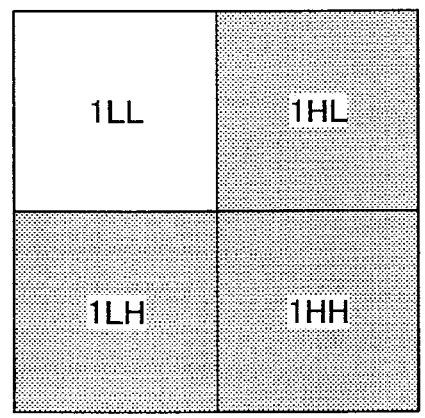
Decomposition Level 1
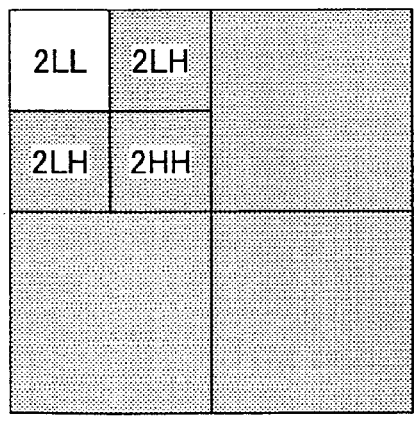
Decomposition Level 2
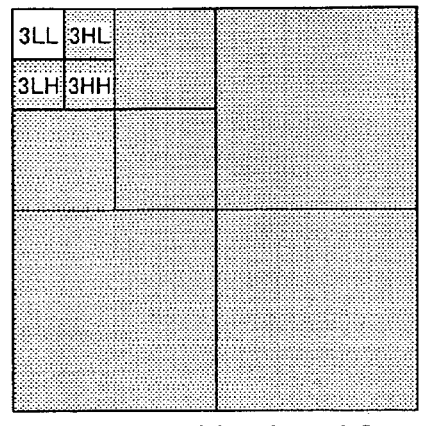
Decomposition Level 3

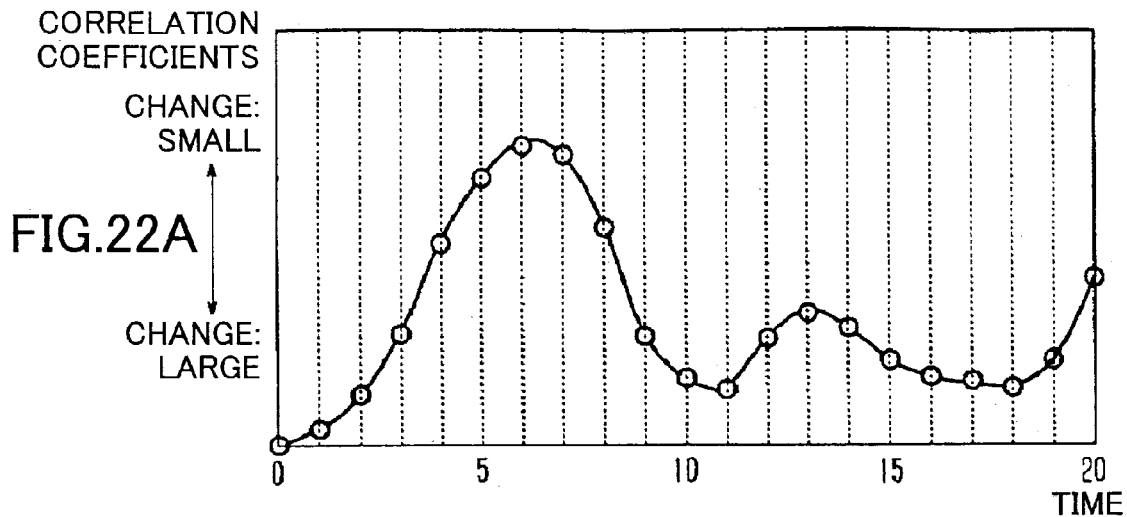
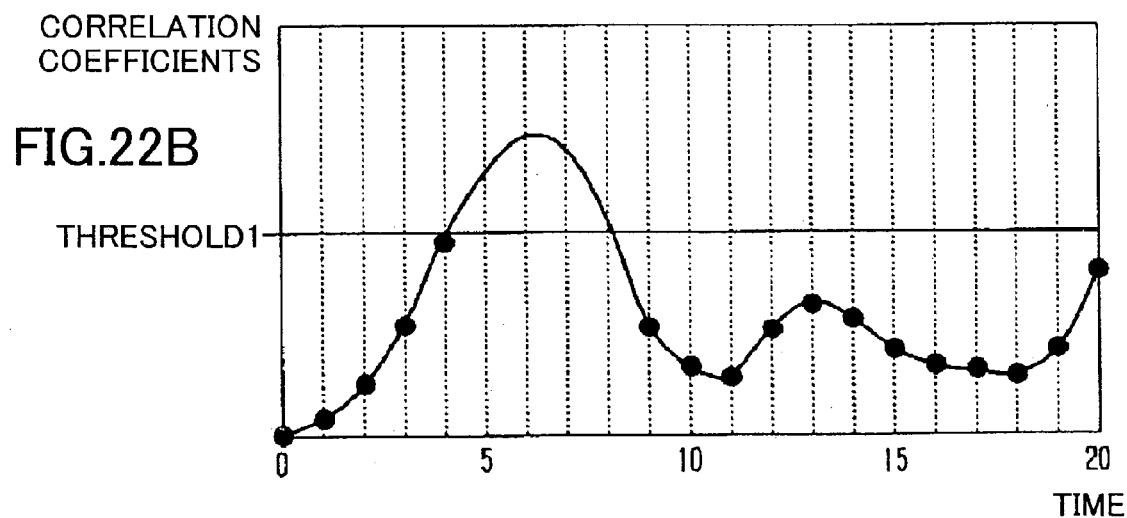
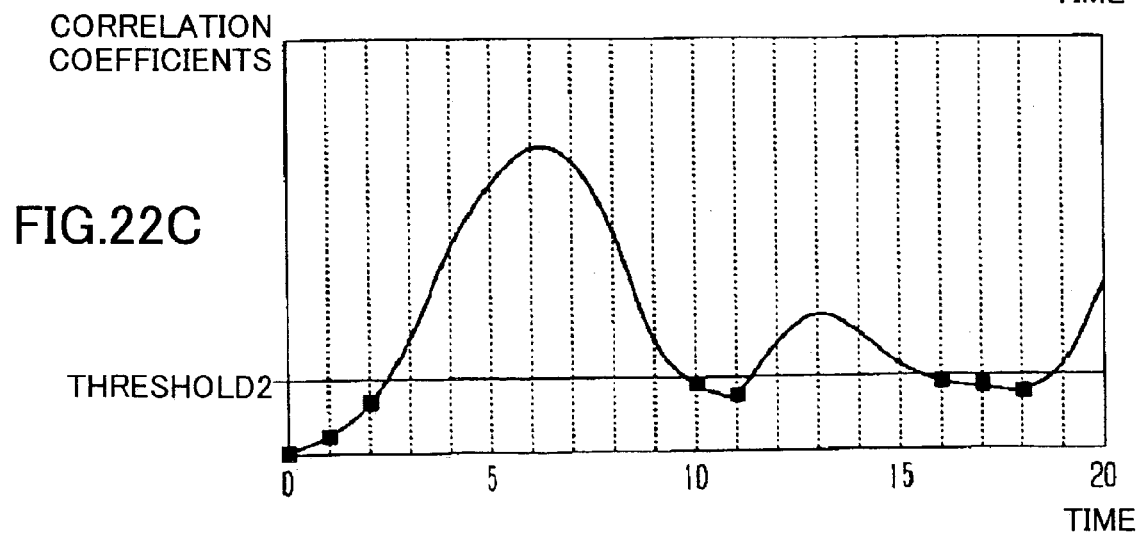

IMAGE PROCESSING APPARATUS, IMAGE RECORDING APPARATUS, IMAGE REPRODUCING APPARATUS, CAMERA SYSTEM, COMPUTER PROGRAM, AND STORAGE MEDIUM

BACKGROUND OF THE INVENTION

1. Field of the Invention

The present invention relates to an image processing apparatus, an image recording apparatus, an image reproducing apparatus, a camera system, a computer program, and a storage medium. More specifically, the present invention relates to image processing that is provided to cancel the redundancy of compressed image data in case there is no motion of the image between the frames, for use in a standard system with the Motion-JPEG2000 method being adopted.

2. Description of the Related Art

Conventionally, the image compression/expansion algorithms include the MPEG1/MPEG2/MPEG4 for motion pictures and the Motion JPEG which handles the still pictures as continuous frames.

Recently, the Motion-JPEG2000 standard is under development as a new intra-frame coding method for motion pictures utilizing the still image coding standard JPEG2000.

One of the differences between the MPEG method and the JPEG method is that the latter performs only the intra-frame coding. Not only this, another difference is that the former method has the ability to take correlations of the images in the same frame as well as the images between different frames and to increase the compressibility of images more.

The JPEG method, which handles the respective frames independently, has the ability to edit each frame, as compared with the former, and the error of one frame at the time of transmission does not affect other frames.

Thus, the MPEG method and the JPEG have the features respectively, and one of them is selectively used for different applications properly.

The Motion-JPEG2000 method utilizes the discrete wavelet transform (DWT) as the compression coding method. Japanese Laid-Open Patent Application No. 2001-309381 discloses a technique which carries out the compression coding of image data using the discrete wavelet transform.

In the technique of Japanese Laid-Open Patent Application No. 2001-309381, the discrete wavelet transform of the pixel values is performed and the correlation of the images between different frames is taken, and the redundancy of image data in case there is no motion of the image between the frames is canceled. Hence, the compressibility of image data can be increased.

However, after carrying out the discrete wavelet transform of the pixel values of image data, the above-mentioned technique takes the correlation of the images between different frames using the wavelet transform coefficients before quantizing and coding, and it is made to cancel the redundancy of image data in case there is no motion of the image between the frames.

Therefore, it is difficult for a standard system, which is provided to treat the data format of the Motion-JPEG2000 method, to make use of a codestream obtained through the above technique after the data compression. Moreover, it is impossible to leave a codestream which is obtained through the compression coding by the Motion-JPEG2000 method but the redundancy of the image data in case there is no motion of the image between the frames is not yet canceled.

Therefore, the codestream generated by the above technique has too small flexibility, and it cannot be easily used by the standard system in which the Motion-JPEG2000 method is adopted. In order to use such codestream, it is necessary to prepare a special system of exclusive use.

SUMMARY OF THE INVENTION

An object of the present invention is to provide an improved image processing apparatus in which the above-described problems are eliminated.

Another object of the present invention is to provide an image processing apparatus that is highly flexible and provided to cancel the redundancy of image data in case there is no motion of the image between different frames, and to generate a codestream which can be easily used by a standard system in which the Motion-JPEG2000 method is adopted.

Another object of the present invention is to provide an image processing apparatus that is able to expand the codestream, obtained by the above compression coding, into a reconstructed image data, which can be easily used by a standard system in which the Motion-JPEG2000 method is adopted.

The above-mentioned objects of the present invention are achieved by an image processing apparatus which processes image data of a motion picture having a number of frames, each frame being divided into one or a plurality of rectangular portions, the image processing apparatus comprising: an image compression device performing a discrete wavelet transform of pixel values for each rectangular portion to produce wavelet coefficients, and performing a hierarchical compression coding of the wavelet coefficients for each rectangular portion so that a codestream is produced; and a codestream transform device provided to reduce an amount of code data in the codestream after the compression coding, the codestream transform device comprising: a syntax analysis unit analyzing header information of each rectangular portion in the codestream; a comparison unit determining a similarity between a current frame and a preceding frame in the codestream based on a result of the analysis of the syntax analysis unit; and a codestream generating unit deleting code data of a corresponding rectangular portion of the current frame when the similarity is larger than a given threshold value.

The above-mentioned objects of the present invention are achieved by an image processing apparatus which processes image data of a motion picture having a number of frames, each frame being divided into one or a plurality of rectangular portions, the image processing apparatus comprising: a codestream transform device receiving a first codestream after compression coding of image data, the first codestream having code data reduced by comparison between frames in the first codestream, and the codestream transform device compensating for the reduced code data so that a second codestream in which the reduced code data is restored is produced; and a wavelet expansion unit performing an inverse discrete wavelet transform of the second codestream for each rectangular portion to generate wavelet coefficients, the codestream transform device comprising: a syntax analysis unit analyzing header information of each rectangular portion in the first codestream; and a codestream generating unit inserting code data of a preceding frame into a current frame in the first codestream when the current frame is detected as containing a deletion code data based on a result of the analysis of the syntax analysis unit, so that the second codestream in which the reduced code data is restored is produced.

According to the image processing apparatus of the present invention, the redundancy of the image data in case there is no motion of the image between the frames can be easily canceled with the codestream transform device after carrying out compression coding in the data format of the Motion-JPEG2000 method by the image compression device.

The codestream after processing is simply convertible for the data format of the standard of the Motion-JPEG2000 method only by compensating the reduced code data by the codestream transform device.

Moreover, since it can also leave the data format of the standard of the Motion-JPEG2000 method with the data still in the state after processing by the image compression device.

Flexibility is high and can generate the codestream which can be used by a standard system in which the Motion-JPEG2000 method is adopted.

Therefore, after carrying out compression coding in the data format of the standard of the Motion-JPEG2000 method, the codestream is aimed at the reduction of the redundancy of the image data in case there is no motion of the image between the frames. It can be returned to the data format of the Motion-JPEG2000 method by the codestream transform device, and it can be expanded to the original image data with an image decompression device further. Hence, the codestream can be easily expanded by using a standard system in which the Motion-JPEG2000 method is adopted.

BRIEF DESCRIPTION OF THE DRAWINGS

Other objects, features and advantages of the present invention will be apparent from the following detailed description when read in conjunction with the accompanying drawings.

FIG. 2 is a diagram for explaining the hierarchical coding algorithm and the JPEG2000 algorithm.

FIG. 3 is a diagram for explaining the hierarchical coding algorithm and the JPEG2000 algorithm.

FIG. 22A, FIG. 22B and FIG. 22C are diagrams for explaining a change of the threshold of the correlation coefficients.

DETAILED DESCRIPTION OF PREFERRED EMBODIMENTS

A description will now be provided of the preferred embodiments of the present invention with reference to the accompanying drawings.

A description will be given of the outline of the hierarchical coding algorithm and the JPEG2000 algorithm with reference to FIG. 1 through FIG. 5.

Figure 1:
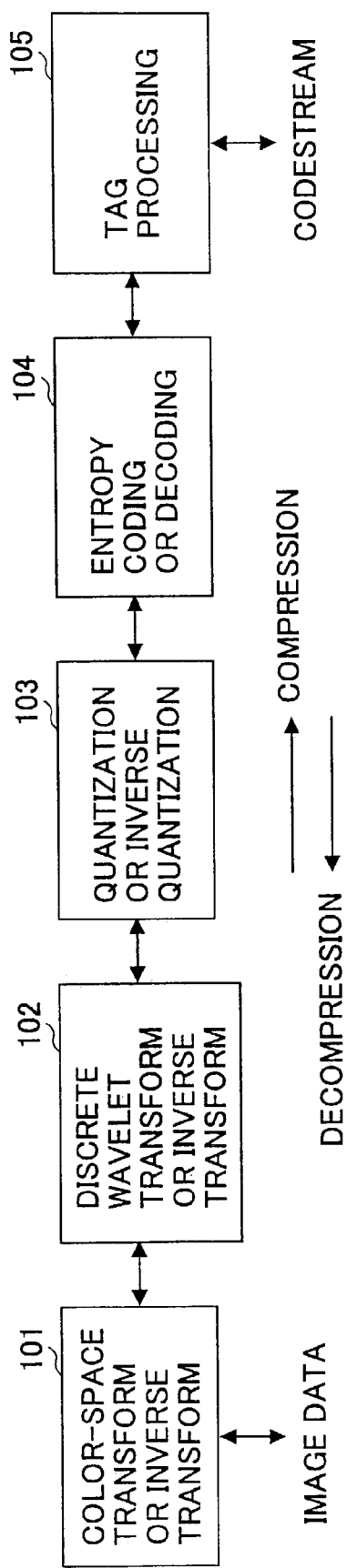
FIG. 1 is a block diagram of a system which realizes the hierarchical coding algorithm which is the fundamental function of the JPEG2000 method.

FIG. 1 shows a system which realizes the hierarchical coding algorithm which is the fundamental function of the JPEG2000 method.

The system of FIG. 1 is constituted by a set of function blocks including a color-space transform (or inverse transform) unit 101, a 2-dimensional wavelet transform (or inverse transform) unit 102, a quantization (or inverse quantization) unit 103, an entropy coding (or decoding) unit 104, and a tag processing unit 105.

One of the major points that the system of FIG. 1 differs from the conventional JPEG algorithm is the transform method.

In the case of the conventional JPEG algorithm, the discrete cosine transform (DCT) is used. In the case of the system of FIG. 1, the discrete wavelet transform (DWT) is used as the hierarchical coding algorithm by the 2-dimensional wavelet transform (or inverse-transform) unit 102.

Compared with the DCT, the DWT has the advantage that the quality of image in high compression ranges is high. This is because the JPEG2000 algorithm, which is the succeeding algorithm of JPEG, has adopted the DWT.

Moreover, with the hierarchical coding algorithm, another difference is that the system of FIG. 1 is provided with the tag processing unit 105 as an additional function block, in order to perform tag (headers, SOC, EOC) formation and codestream formation at the last stage of the system.

In the tag processing unit 105, at the time of image compression operation, compressed image data are generated as a codestream, and the interpretation of the codestream required for image expansion is performed at the time of image expansion operation.

The JPEG2000 method provides various convenient functions with the codestream. For example, as shown in FIG. 3, compression/expansion operation of the still image can be freely stopped at an arbitrary stage (decomposition level) corresponding to the octave division in the DWT in the block base.

The color-space transform (or inverse-transform) unit 101 is connected to the I/O part of the original image in many cases.

The color-space transform unit 101 is equivalent to, for example, the part which performs the color-space conversion to the RGB calorimetric system which includes each component of R(red)/G(green)/B(blue) of the primary-colors system, or the YUV or YCbCr colorimetric system which includes each component of Y(yellow)/M(magenta)/C(cyanogen) of the complementary-colors system from the YMC colorimetric system.

Moreover, the color-space inverse-transform unit 101 is equivalent to the inverse color-space conversion that is the reverse processing to the above color-space conversion.

Next, a description will be given of the JPEG2000 algorithm.

Generally, the color image is divided into rectangular portions where each component 111 (RGB primary-colors system) of the original picture as shown in FIG. 2.

The rectangular portion is generally called the block or the tile, and it is common to call it the tile as for this divided rectangular portion according to the JPEG2000. It is hereinafter made to describe such a divided rectangular portion as being the tile. In the example of FIG. 2, each component 111 is divided in each direction into 4×4 rectangular portions. Each of the 16 pieces of the rectangles is called the tile 112.

Each tile 112 (which is, in the example of FIG. 2, R00, R01, . . . , R15, G00, G01, . . . , G15, B00, B01, . . . , B15) serves as the base unit at the time of performing the compression or expansion process of the image data. Therefore, the compression or expansion operation of the image data is performed independently for every component and for every tile 112.

After the data of each tile 112 of each component 111 are inputted into the color-space transform (or inverse-transform) unit 101 of FIG. 1 and color-space transform is performed at the time of the coding of the image data, 2-dimensional wavelet transform (forward transform) is performed by the 2-dimensional wavelet transform 102, and space division is carried out in the frequency domain.

In FIG. 3, the sub band in each decomposition level in case the number of decomposition levels is 3 is shown.

The tile of the original image is initially obtained. To the original image tile (0LL) (decomposition level 0), 2-dimensional wavelet transform is performed and the sub band (1LL, 1HL, 1LH, 1HH) shown in the decomposition level 1 is separated.

Subsequently, to low-frequency component 1LL in this layer, 2-dimensional wavelet transform is performed and the sub band (2LL, 2HL, 2LH, 2HH) shown in the decomposition level 2 is separated.

Similarly, 2-dimensional wavelet transform is performed also to low-frequency component 2LL, and the sub band (3LL, 3HL, 3LH, 3HH) shown in the decomposition level 3 is separated one by one.

As shown in FIG. 3, the sub band set as the object of the coding in each decomposition level is expressed with the gray.

For example, when the number of decomposition levels is set to 3, the sub band components (3HL, 3LH, 3HH, 2HL, 2LH, 2HH, 1HL, 1LH, 1HH) shown in the gray serve as the candidate for the coding, and the sub band component 3LL is not coded.

Subsequently, the bit set as the object of the coding in the turn of the specified coding is appointed, and the context is generated from the bit of the object bit circumference by the quantization (inverse quantization) unit 103 shown in FIG. 1.

The wavelet coefficients after the processing of the quantization are divided into the rectangles which are called the precincts and not overlapping for each of the sub bands. This is introduced in order to use the memory efficiently by implementation.

Figure 5:
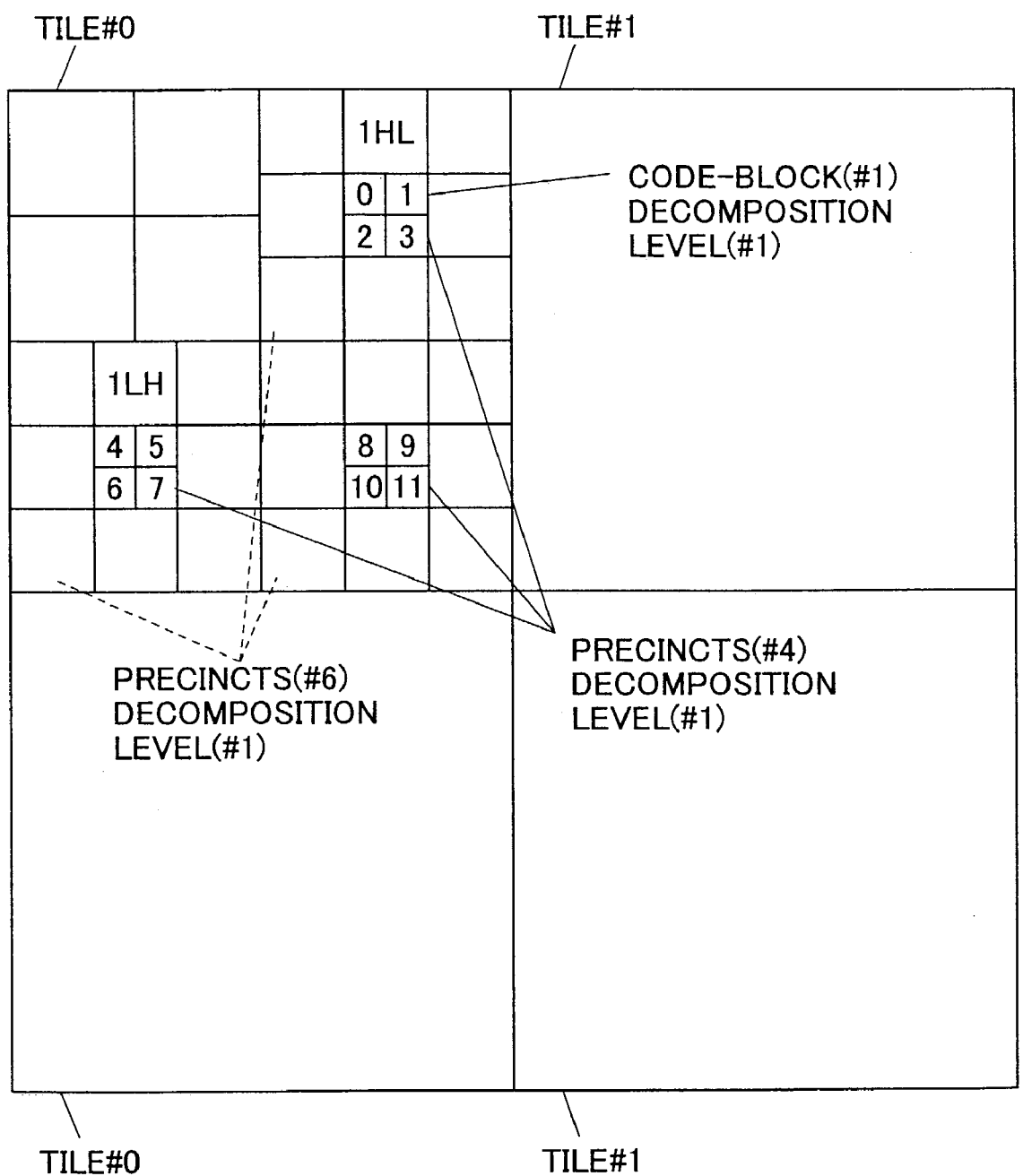
FIG. 5 is a diagram for explaining the hierarchical coding algorithm and the JPEG2000 algorithm.

As shown in FIG. 5, one precinct includes the three rectangular portions which are spatially in agreement.

Furthermore, each precinct is divided into the code block of the rectangle not overlapping. This serves as the base unit at the time of performing entropy coding.

In the entropy coding (or decoding) unit 104 shown in FIG. 1, probability presumption enables the coding to the tile 112 of each component 111 to be performed from the context and the object bit.

In this way, coding processing is performed in the tile 112 unit about all the components 111 of the original image.

Finally, the tag processing unit 105 performs processing which adds the tag to it while combining all the coding data from the entropy coding (or decoding) unit 104 with a single codestream.

Figure 4:
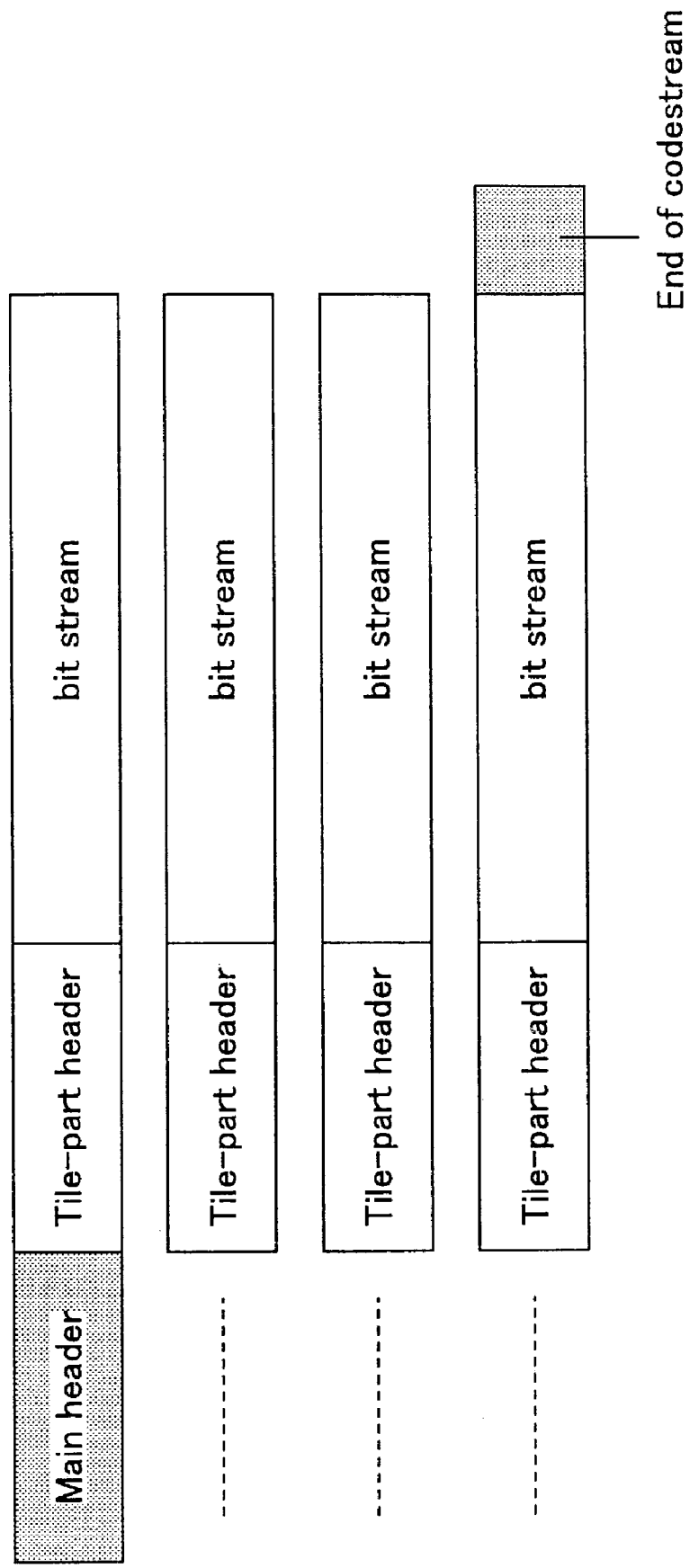
FIG. 4 is a diagram for explaining the hierarchical coding algorithm and the JPEG2000 algorithm.

FIG. 4 shows the composition of one frame of the codestream that is produced by the tag processing unit 105.

The tag information, called the main header, is disposed at the beginning of this codestream. After the main header, the tile-part header of the code data (bit stream) of each tile, and the coding data of each tile are continuously disposed. And, the tag (end of codestream) is disposed at the end of the codestream.

On the other hand, at the time of decoding of the code data, the image data is generated from the codestream of each tile 112 of each component 111 which is the reverse processing to the coding of the image data.

In this case, the tag processing unit 105 interprets the tag information added to the codestream that is inputted from the exterior, decomposes the codestream into the codestream of each tile 112 of each component 111, and performs decoding processing for every codestream of each tile 112 of each of that component 111.

While the location of the bit set as the object of decoding in the turn based on the tag information in the codestream is defined at this time, the context is generated in quantization and the inverse quantization unit 103 from the row of the circumference bit (decoding is already completed) of the object bit position.

In the entropy coding/decoding unit 104, it decrypts by probability presumption from this context and the codestream, the object bit is generated, and it is written in the location of the object bit.

Thus, the space division of the decrypted data is carried out for every frequency band, each tile of each component of the image data is restored in this by performing the 2-dimensional wavelet inverse transformation at the 2-dimensional wavelet inverse-transform unit 102.

The restored data are changed into the image data of the original calorimetric system by the color-space inverse-transform unit 101.

The above description relates to the outline of the JPEG2000 algorithm that deals with the method for the still image, or a single frame. It is extended to the Motion-JPEG2000 algorithm which deals with the method for a plurality of frames.

Next, a description will be given of one preferred embodiment of the present invention.

In the following, the motion picture compression or expansion technique which utilizes the Motion-JPEG2000 representation will be described as one preferred embodiment of the present invention. However, the present invention is not limited to the following embodiment.

Figure 6:
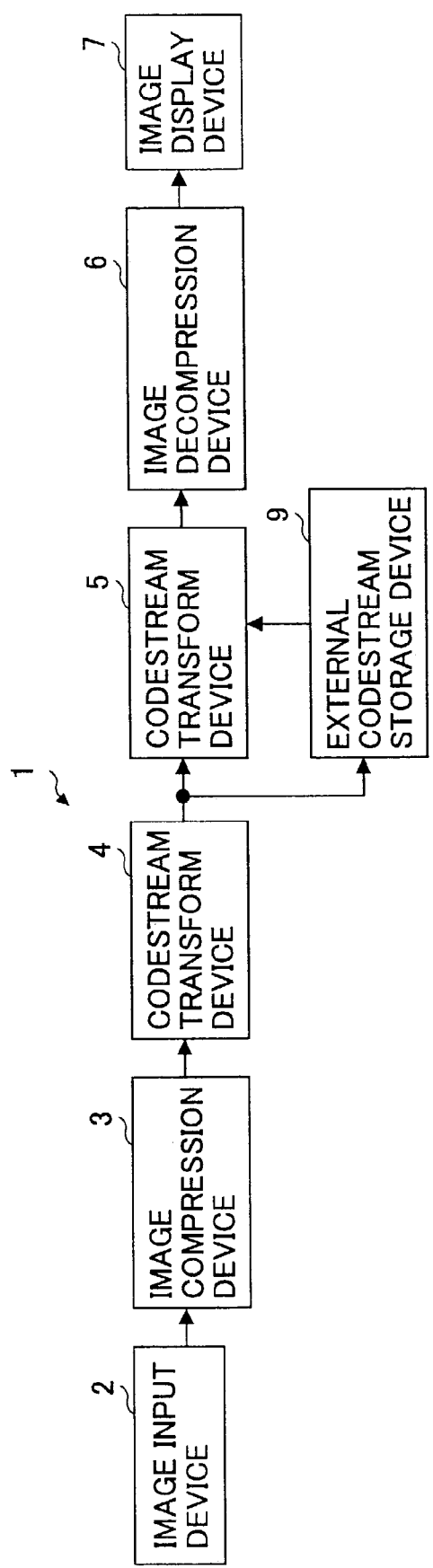
FIG. 6 is a block diagram showing the composition of a monitoring camera system in one preferred embodiment of the present invention.

FIG. 6 shows the composition of a monitoring camera system 1 which is one preferred embodiment of the present invention.

As shown in FIG. 6, the monitoring camera system 1 is configured with the following components.

The image input device 2 picks up a motion picture and inputs the image data of the motion picture. The image compression device 3 carries out the compression coding of the image data from the image input device 2 to produce a codestream. The codestream transform device 4 is provided for image compression, and creates another codestream from the codestream produced by the compression coding of the image compression device 3.

The codestream transform device 5 is provided for image expansion, and creates another codestream from the codestream which is output from the codestream transform device 4. The image decompression device 6 expands the codestream created by the codestream transform device 5 and produces the reconstructed image data. The image display unit 7 displays an image by the reconstructed image data after the image expansion is performed by the image decompression device 6.

The external codestream storage device 9 temporarily stores the codestream output from the codestream transform device 4.

The serial connection of the codestream transform device 4 and the codestream transform device 5 is made by a wired transmission or a wireless transmission. A transmission line (or the wired transmission) may connect between the devices 4 and 5 directly. Alternatively, the devices 4 and 5 may be connected through a network (or the wireless transmission).

The external codestream storage device 9 functions as a common buffer, or functions as the maintenance unit of the codestream of the video over an extended period of time, and is properly used by the application.

The image processing apparatus of the present invention which performs compression coding processing of image data is realized by the image compression device 3 and the codestream transform device 4. Moreover, the image processing apparatus of the present invention which expands the codestream of the compressed image data is realized by the codestream transform device 5 and the image decompression device 6.

Figure 7:
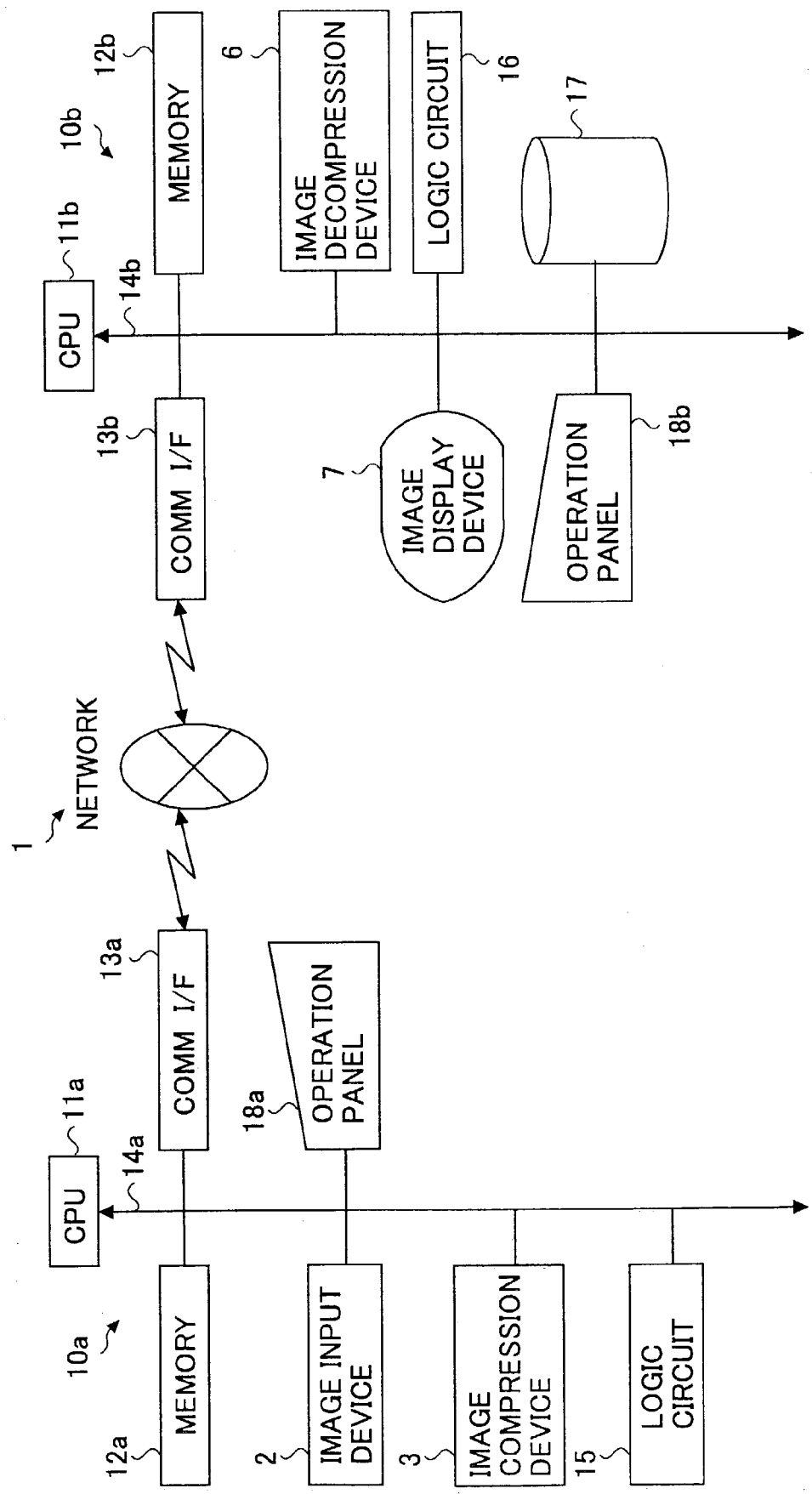
FIG. 7 is a block diagram showing an example of the hardware composition of the monitoring camera system.

FIG. 7 shows an example of the hardware composition of the monitoring camera system 1.

As shown in FIG. 7, the monitoring camera system 1 is constituted by the image recording apparatus 10a and the image reproducing apparatus 10b.

That is, these computer systems 10a and 10b perform various operations, respectively, and the operation panels 18a and 18b which receive various kinds of operations are being connected to the CPUs 11a and 11b. The CPUs 11a and 11b control the respective parts intensively which are interconnected by the buses 14a and 14b, respectively. The memories 12a and 12b are the storage media which include various kinds of ROM and RAM. The communication interfaces 13a and 13b communicate with the network by the user.

As for the image recording apparatus 10a, the image input device 2, the image compression device 3, and the logic circuit 15 are also connected to the bus 13a.

As for the image reproducing apparatus 10b, the image decompression device 6, the image display unit 7, the logic circuit 16, and the hard disk 17 are also connected to the bus 14b.

The video processing program which processes the image data of the input motion picture, is stored in the memory 12a or 12b (ROM) which is the storage medium of the image recording apparatus 10a or the image reproducing apparatus 10b.

This video processing program is a computer program according to the present invention. According to the present invention, the processing which is performed by the CPU 11a or 11b in accordance with the video processing program may realize the function of the codestream transform device 4 or the codestream transform device 5.

Moreover, the hard disk 17 serves as the external codestream storage device 9 in the image reproducing apparatus 10b.

Figure 8:
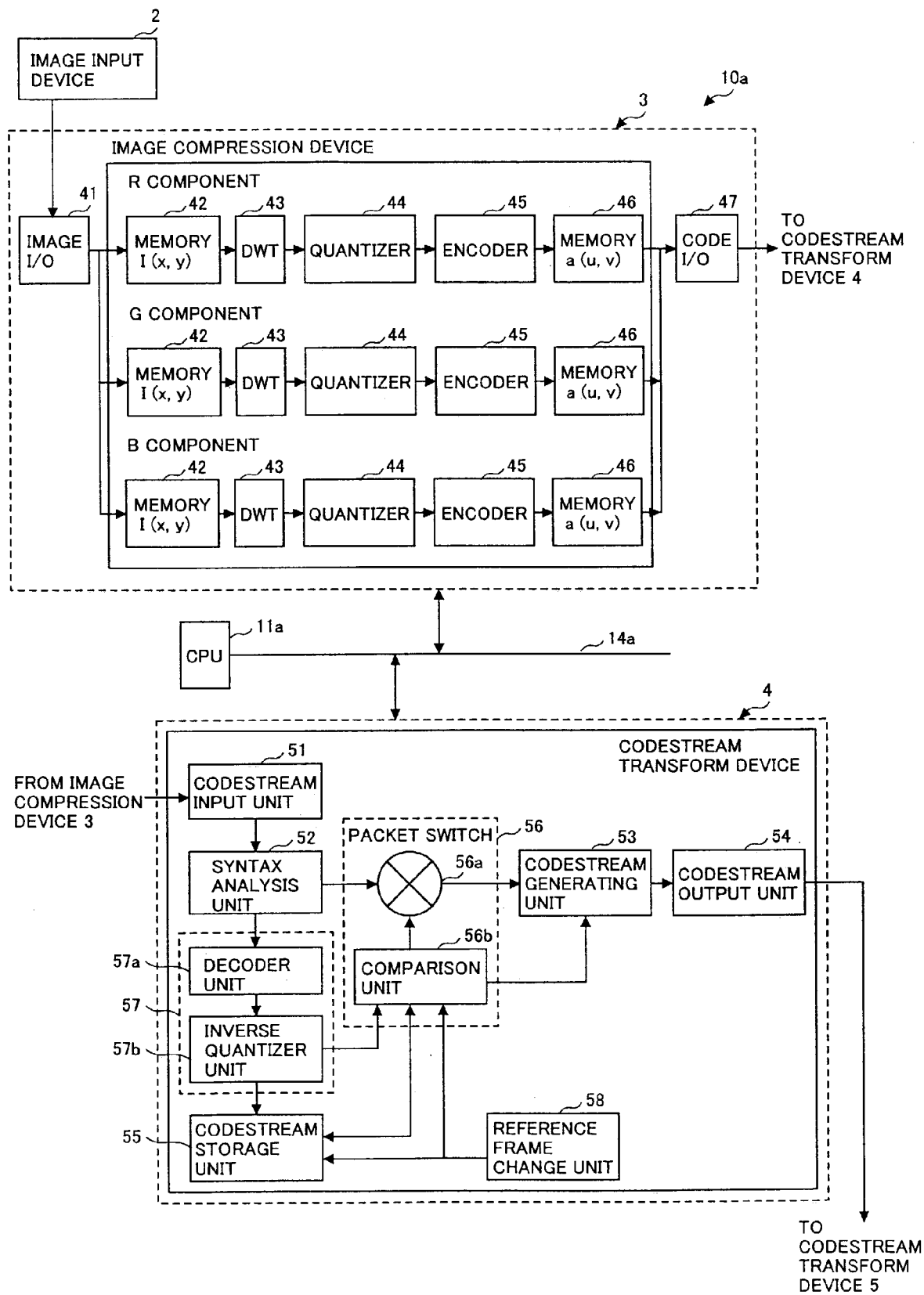
FIG. 8 is a block diagram showing the composition of an image recording apparatus which constitutes a part of the monitoring camera system.
Figure 9:
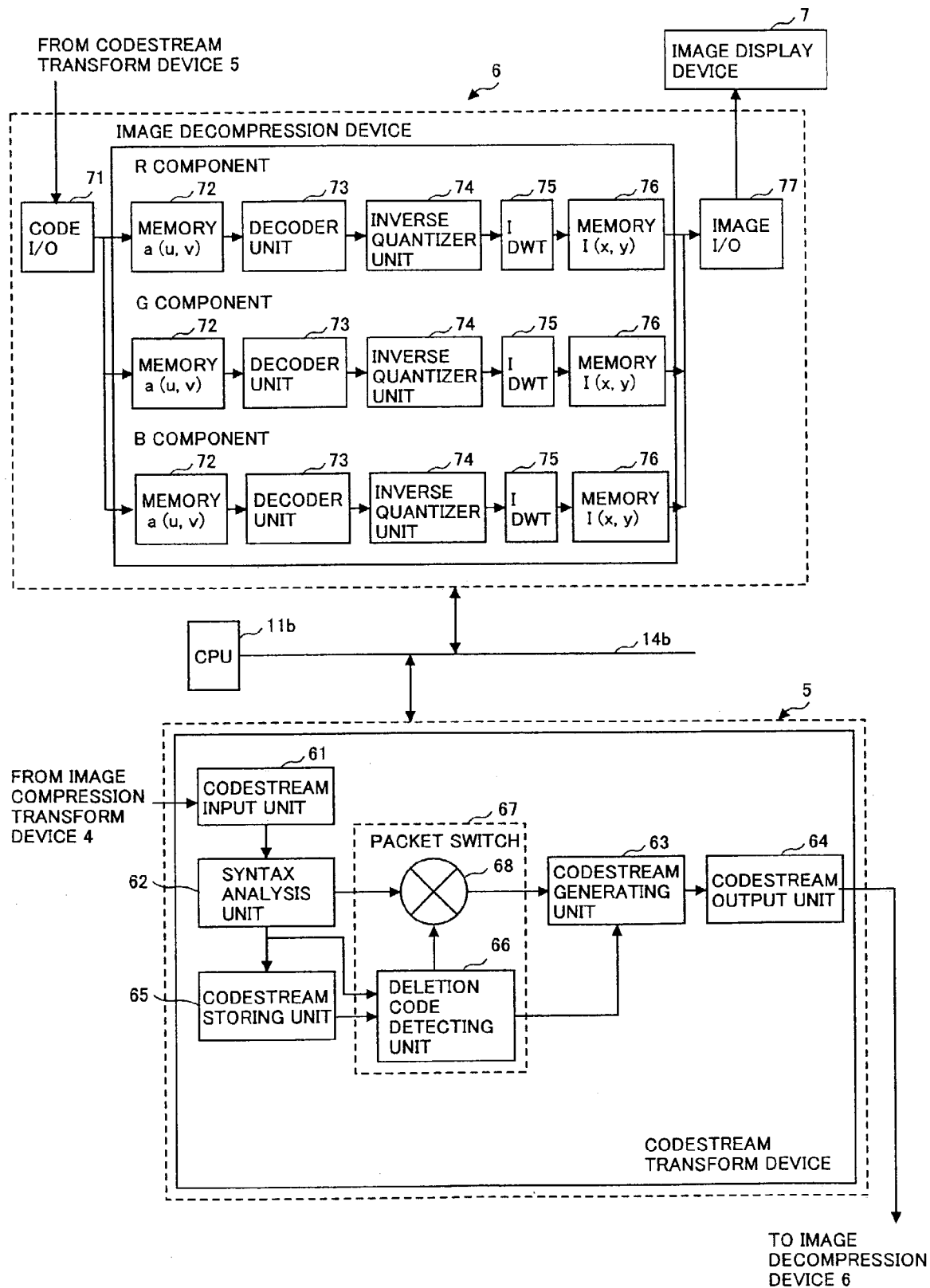
FIG. 9 is a block diagram showing the composition of an image reproducing apparatus which constitutes a part of the monitoring camera system.

With reference to FIG. 8 and FIG. 9, a description will given of the relevant part of the monitoring camera system 1.

First, a description of the image recording apparatus 10a will be given with reference to FIG. 8.

The image input device 2 captures the video per frame using photo-electric-conversion devices, such as CCD and MOS image sensors, and outputs the digital pixel value signal of the motion picture to the image compression device 3.

The image compression device 3 receives the input of the digital pixel value signal of the video through the image I/O 41.

The image compression device 3 carries out the compression coding of the digital pixel value signal in accordance with the JPEG2000 algorithm. That is, the digital pixel value signal of the video received through the image I/O 41 is processed for each component of R, G, and B.

First, the pixel values I (x, y) of each color component, which is R, G, or B, are stored in each memory 42.

And each of the color components, which are R, G, and B, is divided into one or a plurality of tiles, and the pixel values I (x, y) of every tile are converted into the wavelet transform coefficients a (u, v) by each discrete-wavelet-transform unit 43.

In addition, the number of decomposition levels at this time and the number of wavelet layers greatly influence the width of the various functions when operating the codestream.

It is selected based on the number of the pixels of the original picture image, and in the image size of the VGA class, the value of 3 to 5 will usually be adopted as the decomposition level.

Furthermore, the wavelet coefficients a (u, v) are quantized by each quantizer 44 for every layer, every tile, and every component.

The quantization method and quantization step size have a significant influence on the image quality when irreversible compression or expansion is carried out, and they are important.

Then, it is coded for every layer, every tile, and every component with each encoder 45, and the wavelet coefficients a (u, v) are stored in each memory 46.

The information in connection with a series of whole codestream or the information in connection with each frame unit is described by the header, respectively, and is added to the codestream stored in each memory 46 by the tag processing unit (not illustrated). It is outputted to the codestream transform device 4 from the code I/O 47 as a completed codestream.

Since it becomes the coding data in which the image data of each component of the original video are divided into one or a plurality of tiles (usually plurality) for every frame, and compression coding is carried out hierarchically for every tile by the processing of the image compression device 3, the same frame of the original image data and the redundancy in the same tile are removed.

In the codestream transform device 4, for the codestream outputted from the image compression device 3, compression between the frames by taking correlation between the frames is performed, the code data for every tile is reduced, and it changes into the codestream with a fewer amount of image data.

In addition, in the following example, processing of selection or in which it does not choose is performed for every tile, and it can respond flexibly to application by narrowing down the contents of comparison contrast, such as the sub band and the component.

As shown in FIG. 8, the codestream transform device 4 includes the codestream input unit 51, the syntax analysis unit 52, the codestream generating unit 53, the codestream output unit 54, the codestream memory unit 55, and the input image selection unit 56 (which includes the comparison unit 56a and the packet switch 56b).

The processing which is performed by the CPU 11a according to the above-mentioned video processing program may realize the codestream input unit 51, the codestream generating unit 53, the codestream output unit 54, the codestream memory unit 55, the comparison unit 56a.

It is also possible that the processing performed by the CPU 11a according to the video processing program realize the syntax analysis unit 52 and the input image selection unit 56. However, when importance is attached to real time processing and it is necessary to accelerate the processing, it is desirable that using the logic circuit 15 instead of the video processing program, is made to realize the functions of the input image selection unit 56 and the codestream generating unit 53.

The processing performed by the CPU 11a according to the video processing program (or the logic circuit 15) causes the syntax analysis unit 52 to analyze the information described by the syntax of the codestream that is produced by and inputted from the image compression device 3. The information being analyzed is the information of the header of the codestream, which describes how the codestream is produced.

Once the header information is analyzed, it is possible to definitely determine how the subsequent processing is performed for the codestream.

There are some conceivable methods to determine whether the code data of each tile in the codestream is selected as the input image. In the following, an example of such method, the method that utilizes the comparison of the wavelet coefficients of a specific sub band between respective frames will be explained.

The header information and the wavelet coefficients of a preceding frame, preceding the current frame and being inputted into the codestream transform device 4, are the necessary data to determine the selection of the codestream. The data are separately stored in predetermined areas of the memory 12a based on the header information analyzed by the syntax analysis unit 52. The predetermined areas of the memory 12a correspond to the codestream memory unit 55.

In this case, the wavelet coefficients, obtained after the decoding and the inverse quantization of the code data is performed by the transform unit 57, are stored. The transform unit 57 includes the decoding unit 57a and the inverse quantization unit 57b, and the decoding unit 57a and the inverse quantization unit 57b perform the decoding and the inverse quantization of the code data to produce the wavelet coefficients that are equivalent to those before the quantization is performed.

In the comparison unit 56a, the correlation coefficient between the current frame and the preceding frame is determined by comparing respectively the wavelet coefficients of the current frame and the preceding frame using the wavelet coefficients after the decoding and inverse quantization are performed. In other words, the comparison unit 56a determines the similarity of the wavelet coefficients between the current frame and the preceding frame, and compares the same with a predetermined threshold value.

The number of the frames that are referred back to for this comparison is at least one (only the latest frame), or preferably several preceding frames.

In the comparison unit 56a, when the correlation coefficient value of the current frame and the preceding frame is above the threshold value, there is no significant difference between the current frame and the preceding frame. In this case, the current frame is not chosen as the input image by the input image selection unit 56.

When the current frame is not chosen as the input image, the packet switch 56b is turned OFF, the code data of the corresponding tile that is determined to be redundant in the codestream of the image part of the current frame is deleted. Therefore, the amount of code data in the codestream is reduced.

At the same time, in the codestream generating unit 53, the frame number specified that it becomes the alternative of the deleted code data is described to the header of the current frame. In this way, the codestream of the current frame which includes only the header is outputted to the network by the codestream output unit 54.

On the other hand, when there is a significant difference. between the current frame and the preceding frame and the correlation coefficient value of the current frame and the preceding frame is below the threshold value, the current frame is chosen as the input image.

In this case, the switch 56b is set in the ON state, and the codestream is outputted to the network by the codestream output unit 54 without deleting the codestream of the current frame at the input image selection unit 56.

When there are many frames that are referred to by the comparison unit 56a as the preceding frames for the comparison, the correlation between the frames will become high and will contribute to reduction of the amount of code data in the codestream greatly as a result.

On the other hand, however, the processing time needed for the comparison of the wavelet coefficients and the rewriting of header information for every frame becomes long, and a large capacity is needed for the buffer memory to store the wavelet coefficients.

Therefore, after fully taking the actual use situation into consideration in using the codestream transform device 4, it is necessary to optimize the number of the preceding frames which should be referred to.

Next, a description will be given of the flow of processing of the codestream transform device 4 with reference to FIG. 19.

Figure 19:
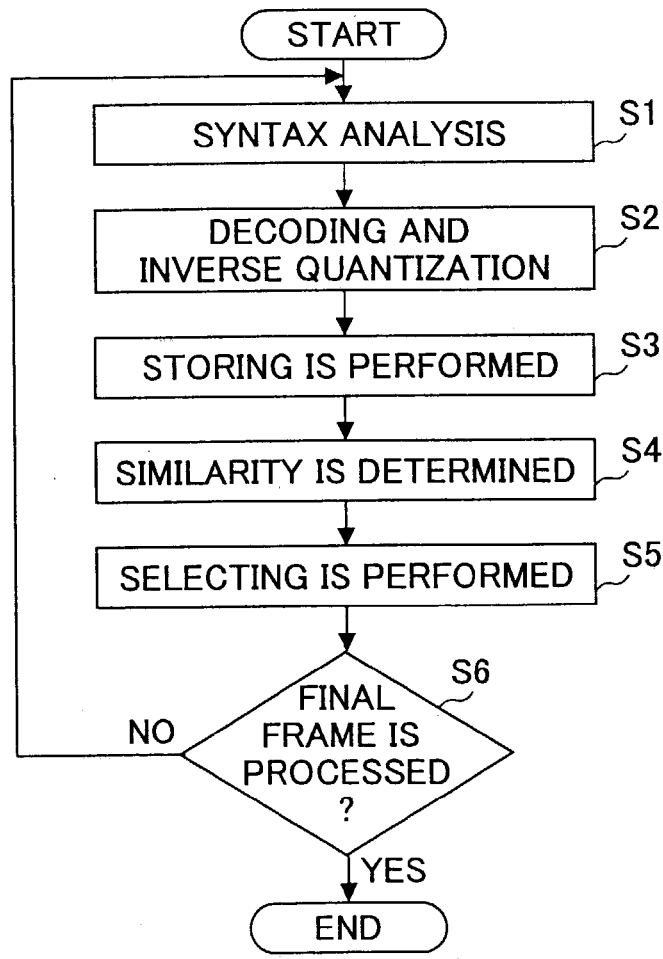
FIG. 19 is a flowchart for explaining the processing which is executed by the image recording apparatus.

As shown in FIG. 19, the syntax analysis unit 52 performs analysis of the header information of the codestream (step S1). Based on the analyzed contents of the header information, the decoding and inverse quantization of the code data for a plurality of frames in the codestream is performed by the transform unit 57 (step S2). The resulting wavelet coefficients of such frames are stored in the codestream memory unit 55, respectively (step S3).

Step S1 corresponds to the syntax analysis processing, and step S2 corresponds to the transform processing.

In the comparison unit 56a, the similarity of the wavelet coefficients between the current frame and the preceding frame is determined by comparing respectively the wavelet coefficients of the current frame and the preceding frame using the wavelet coefficients after decoding and inverse quantization. In other words, the correlation coefficient is determined by comparing the similarity with the predetermined threshold value (step S4).

By the determination, when the correlation coefficient value is larger than the threshold value, the tile has a high similarity between the current frame and the preceding frame, the packet switch 56b is turned off and the code data for every tile is deleted.

When the correlation coefficient value is below the threshold value, the tile has a low similarity between the current frame and the preceding frame, the packet switch 56b is turned on, and it may leave the code data for every tile (step S5).

Such processing is repeatedly performed to the last frame (step S6) with the codestream generating unit 53. The new header information is added to the code data which remains by the processing of step S5, the new codestream is created, and the reduction of the amount of code data in the tiles of the codestream is performed. Step S5 corresponds to the codestream creation processing.

Next, a description will be given of the image reproducing apparatus 10b of FIG. 7.

In the image reproducing apparatus 10b, the codestream, which outputted by the codestream transform device 4 (FIG. 6) for compression and is transmitted to the image-reproducing-apparatus 10b through the network, is stored in the external codestream storage device 9 (FIG. 6), and is processed by the codestream transform device 5 (FIG. 6).

As shown in FIG. 9, in the codestream transform device 5, restoration processing of the code data is performed for every tile reduced by the codestream transform device 4 about the received codestream.

The codestream transform device 5 includes the codestream input unit 61, the syntax analysis unit 62, the codestream generating unit 63, the codestream output unit 64, the codestream memory unit 65, and the input image code-data insertion unit 67 (which includes the deletion code detection unit 66 and the packet switch 68).

The processing which is executed by the CPU 11b according to the video processing program may realize the codestream input unit 61, the codestream generating unit 63, the codestream output unit 64, the codestream memory unit 65, and the deletion code detection unit 66.

With the processing performed by the CPU 11b according to the video processing program, the input image code-data insertion unit 67, the codestream generating unit 63, etc. may be realized. However, for improvement in the speed of processing, it is desirable that using the logic circuit 16 realizes the functions of the input image code-data insertion unit 67 and the codestream generating unit 63.

The syntax analysis unit 62 analyzes the header information of the codestream inputted into the codestream input unit 61.

The inputted codestream provides information as to how the amount of code data is reduced by the codestream transform device 4 for compression.

When the header information is analyzed, restoration processing of the codestream will be determined in the following manner.

Based on the analysis result by the syntax analysis unit 62, the header information and the wavelet coefficients (code data) for two or more preceding frames are separately stored in the predetermined areas of the memory 12b (FIG. 7). Such areas of the memory 12b correspond to the codestream memory unit 65 shown in FIG. 9.

When the current frame is not chosen as the input image in the above-mentioned processing by the codestream transform device 4 (FIG. 8), the codestream includes only header information. Then, it is necessary to substitute another code data for the code data of the image part that is deleted and does not exist.

Therefore, the deletion code-data detection unit 66 turns OFF the switch 68 temporarily, the code data which remains in the perfect form with the frame number specified as an alternative for header information is read from the codestream memory unit 65, and the codestream generating unit 63 performs processing which inserts the read code data at the location following the header where the consecutive code data does not exist.

Thus, the codestream after restoration processing is made is outputted to the image decompression device 6 by the codestream output unit 64.

On the other hand, in the code data of the tile which is not set as the object of reduction of the amount of code data by the codestream transform device 4 (FIG. 8), the deletion code-data detection unit 66 leaves the switch 68 in the ON state, and the code data of the current frame in the unchanged state is outputted to the image decompression device 6 by the codestream output unit 64.

A description will be given of the outline of the flow of processing of the codestream transform device 5 with reference to FIG. 20.

Figure 20:
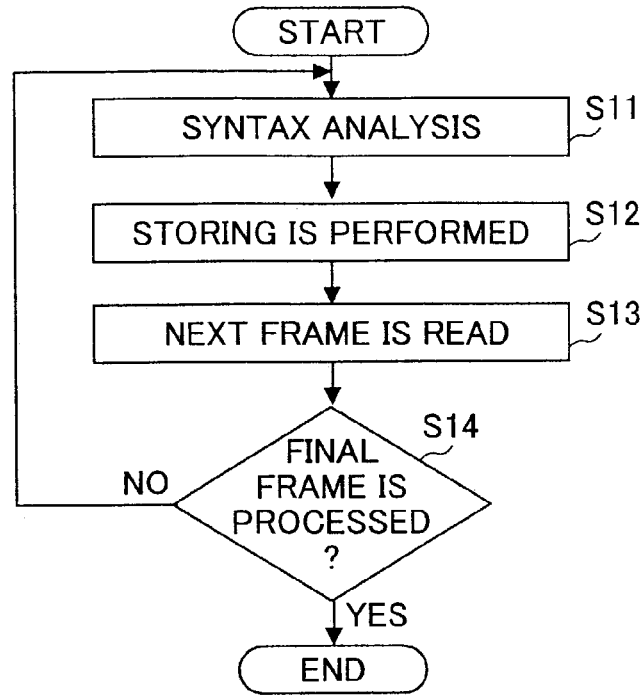
FIG. 20 is a flowchart for explaining the processing which is executed by the image reproducing apparatus.

As shown in FIG. 20, the syntax analysis unit 62 performs analysis of the header information on the codestream (step S11). Based on the analyzed contents of the header information, the wavelet coefficients (code data) for two or more frames are stored in the codestream memory unit 65 (step S12). Step S11 corresponds to the syntax analysis processing.

The deletion code-data detection unit 66 turns OFF the switch 68 temporarily at the tile in which the code data does not exist only by the header, and the code data which remains in the perfect form with the frame number specified as an alternative for the information of the header is read from the codestream memory unit 65, and the codestream generating unit 63 performs processing which inserts the read code data at the location following the header where the consecutive code data does not exist. On the other hand, the switch 68 is set in the ON state at the tile which is not so, and the code data of the current frame is outputted to the codestream generating unit 63 as it is (step S13).

Such processing is repeatedly performed to the last frame (step S14) with the codestream generating unit 63. The new header information is added to the code data inserted by the processing of step S13, the new codestream is created, and restoration of the code data in the tiles of the codestream is performed. Step S13 corresponds to the codestream creation processing.

As shown in FIG. 9, the codestream in which the code data for every tile is restored by the codestream transform device 5 is inputted into the code I/O 71 of the image decompression device 6.

The image decompression device 6 expands the codestream in accordance with the JPEG2000 algorithm.

The codestream that is received through the code I/O 71 is processed for each component of R, G, and B as in the following.

In the image decompression device 6 of FIG. 9, the wavelet transform coefficients a (u, v) of each color component, which is R, G, or B, are inputted into each memory 72, they are decoded by each decoder 73, and the wavelet transform coefficients a (u, v) are inverse quantized by each inverse quantizer 74.

They are inputted into each reverse wavelet transform unit 75, reverse wavelet transform is carried out, and the wavelet transform coefficients a (u, v) of each tile are changed into pixel values I (x, y) of digital image data, and are stored in each memory 76.

In this way, the digital image data expanded for every tile are outputted to the display unit 7 through the image I/O 77, and the video is reproduced.

Next, a description will be given of the processing which is performed by the codestream transform device 4 for compression to determine the similarity between the frames and reduce the amount of code data in the codestream, with reference to FIG. 10 and FIG. 11.

Figure 10:
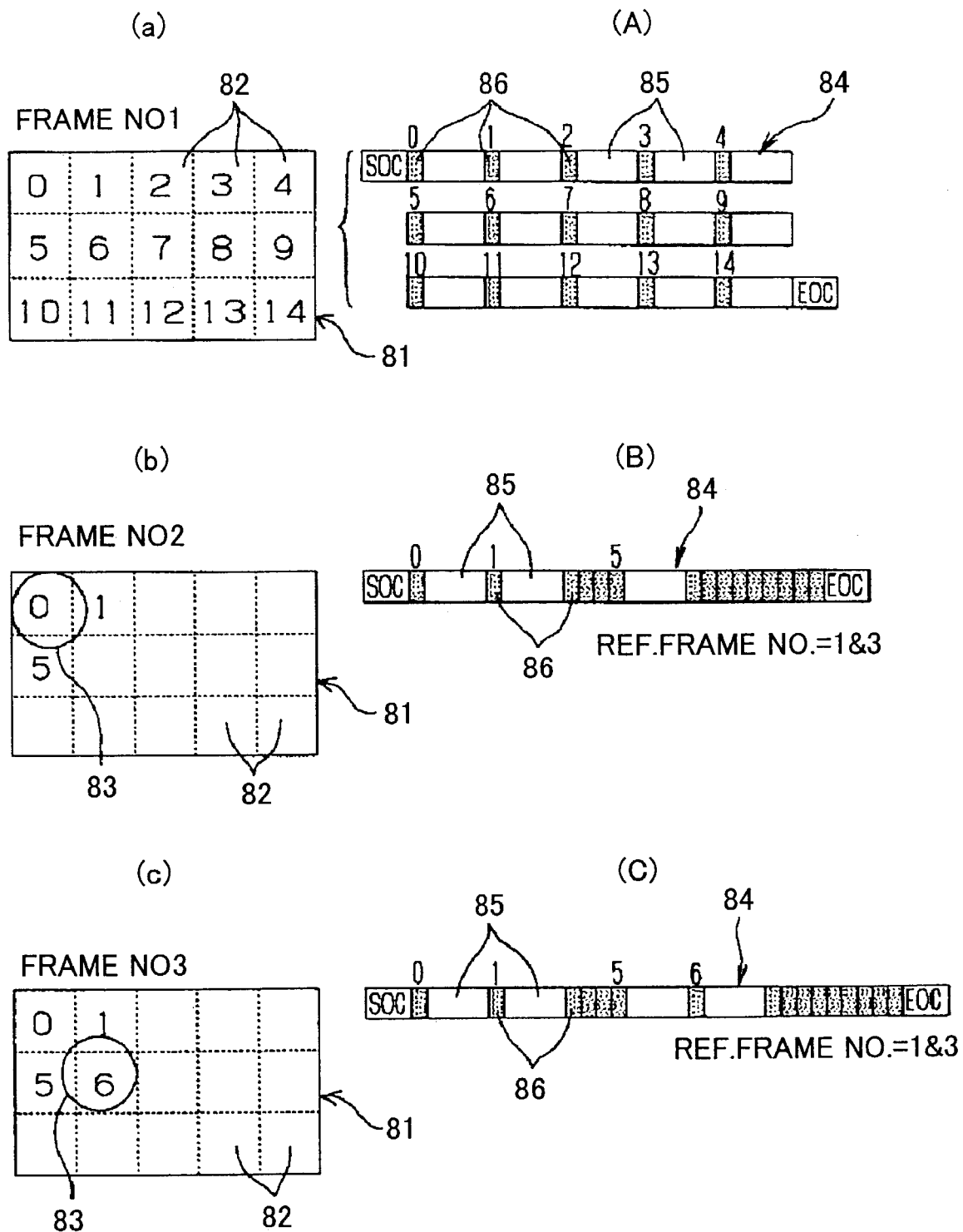
FIG. 10 is a diagram for explaining the processing which is executed by the image recording apparatus.
Figure 11:
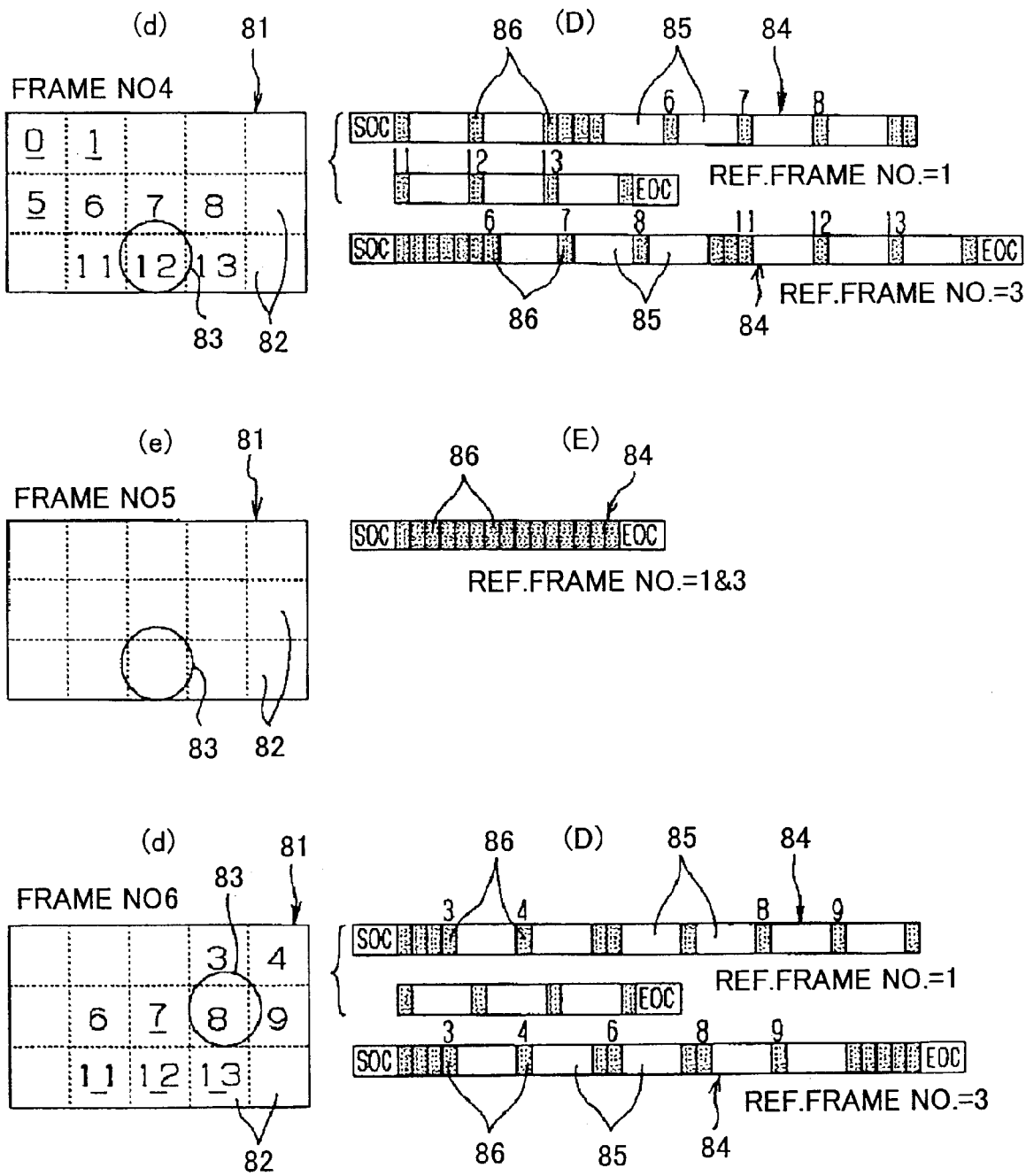
FIG. 11 is a diagram for explaining the processing which is executed by the image recording apparatus.

As shown in FIG. 10 and FIG. 11, in this example, the image area 81 for each frame of the motion picture is divided into the fifteen tiles 82.

With the consecutive frames No. 1 through No. 6 of the motion picture indicated by (a) through (f) in FIG. 10 and FIG. 11, the circular object 83 moves in the image area 81 from the upper left, collides with the central lower part, and moves toward the upper right.

In FIG. 10 and FIG. 11, the tiles 82 with the numeric characters affixed with the underline are the tiles whose change is detected when referring back to the last three preceding frame, and the tiles 82 with the numeric characters affixed are the tiles whose change is detected from the preceding frame, respectively.

In FIG. 10, (A) indicates the code data 84 before the processing of the codestream transform device 4, and in FIG. 10 and FIG. 11, (B) through (F) indicate the respective code data 84 after reduction of the amount of code data by the codestream transform device 4 is performed for each respective case of (b)–(f).

Moreover, reference numeral 85 indicates the code data of each tile 82, and reference numeral 86 indicates the tile header of each code data 84.

The tag of SOC (start of codestream) is disposed at the head of the code data 84, and the tag of EOC (end of codestream) is disposed at the end of the code data 84.

For example, when the 4th frame (FIG. 11(d)) is observed, it is determined the six tiles 82 (6, 7, 8, 11, 12, 13), the three tiles 82 (0, 1, 5) of the upper left range, and a total of nine tiles that it is clearly changing as compared with the 3rd last frame.

Among these, if there are the three tiles 82 (0, 1, 5) with the underlined characters in the completely same state as the tile 82 of this number of the 1st frame (FIG. 10(a)) which already appeared three frames ago, they are determined by the comparison unit 56a.

By the case where it is the case where the number of the frames referred back to by the comparison unit 56a is 1 or 3, the codestream for every frame outputted from the codestream transform device 4 for this compression differ.

In the case of the single frame referred back to, all the nine tiles are chosen as the input image in the current frame, about the six tiles (2, 3, 4, 9, 10, 14) which are not numbered, the code data of the image part is deleted and only the tile header unit is left behind.

On the other hand, in the case of the three frames referred back to, only the six tiles (6, 7, 8, 11, 12, 13) are chosen as the input image. As for the remaining nine tiles, only the header unit is left behind (FIG. 11(D)).

If the number of reference frames is increased, a more amount of codes can be reduced but the time and effort of comparison or header rewriting is required.

The 5th frame (FIG. 11(e)) is considered as another example.

Since the circular object 83 is in the rest state, compared with the 4th last frame (FIG. 11(d)), it is changeless.

Therefore, the code data of the image part is deleted from all the fifteen tiles 82, and the new codestream created turns into very compact data of only the tile header 86 having been located in a line.

Next, another example of the processing which is performed by the codestream transform device 4 for compression to determine the similarity between the frames and reduce the amount of code data of the codestream will be explained with reference to FIG. 12 and FIG. 13.

Figure 12:
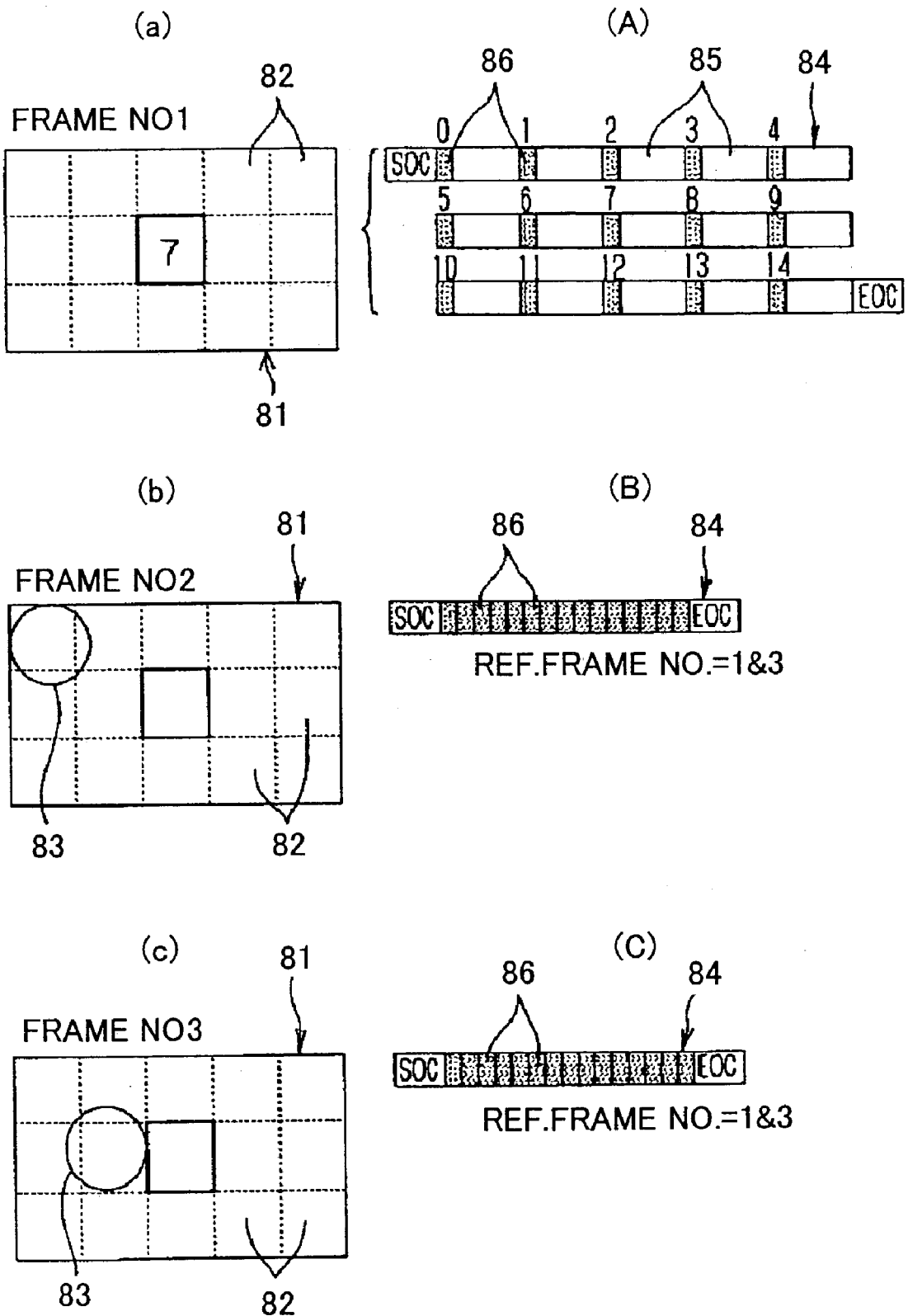
FIG. 12 is a diagram for explaining another example of the processing which is executed by the image recording apparatus.
Figure 13:
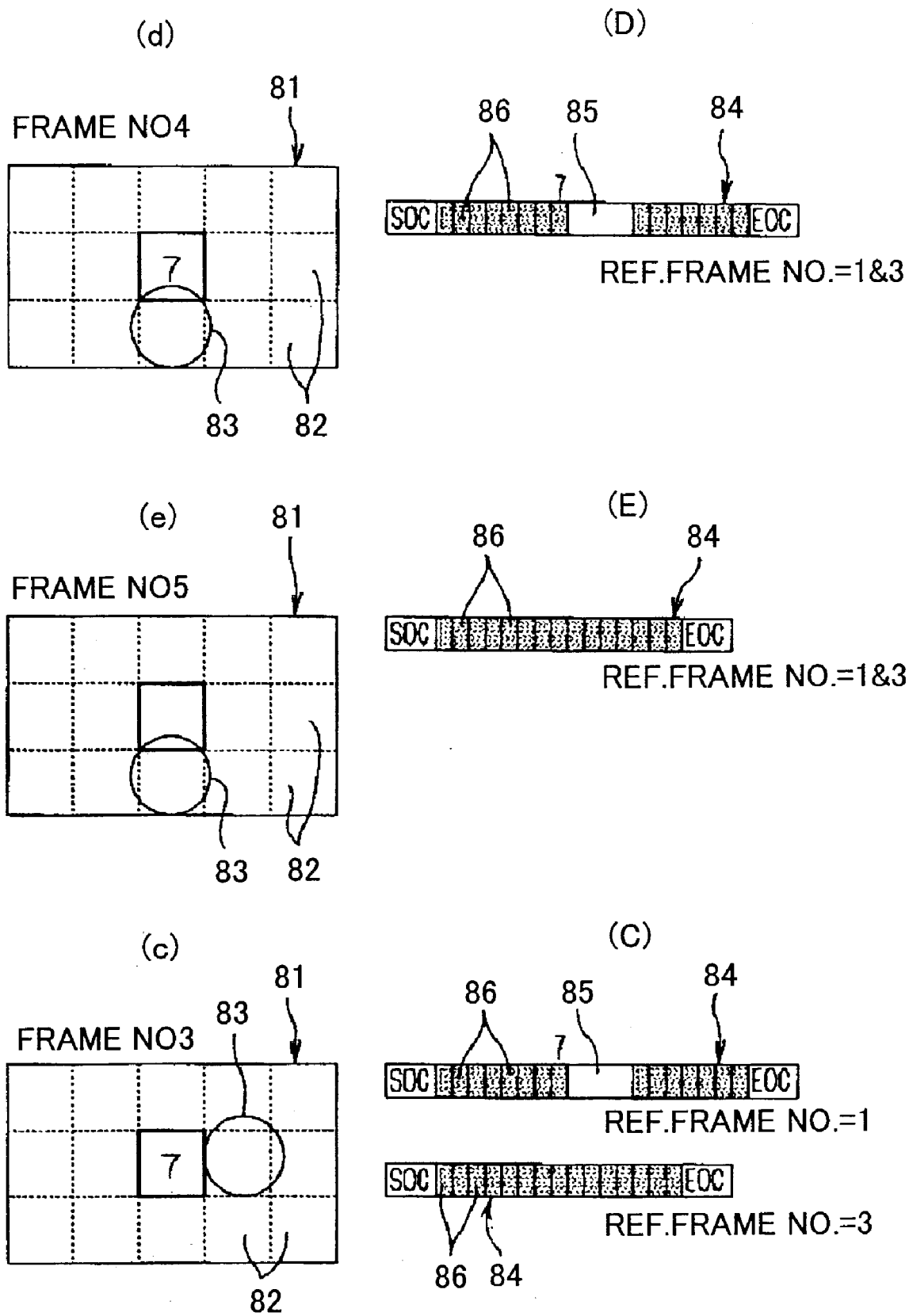
FIG. 13 is a diagram for explaining another example of the processing which is executed by the image recording apparatus.

In FIG. 12 and FIG. 13, the elements which are the same as corresponding elements in FIG. 10 and FIG. 11 are designated by the same reference numerals, and a description thereof will be omitted.

What is different from the example mentioned above with reference to FIG. 10 and FIG. 11 is that the image range set up in order to compute the correlation coefficient is pinpointed to the tile 82 of No. 7 at the center of the image.

It is the 4th and 6th frames (FIGS. 13(d), (e)) at which the object 83 crosses, that change arises to the tile 82 of No. 7.

When the number of the preceding frames referred back to by the comparison unit 56a is set to 1 (minimum), what are chosen as the input image are only the 4th frame (FIG. 13(d)) and the 7th frame (not shown).

Furthermore, when the number of the preceding frames referred back to is set to 3, only the tile 82 of No. 7 of the 4th frame (FIG. 13(d)) is chosen as the input image.

Next, the processing which is performed by the codestream transform device 5 for expansion to restore the codestream will be described.

Figure 14:
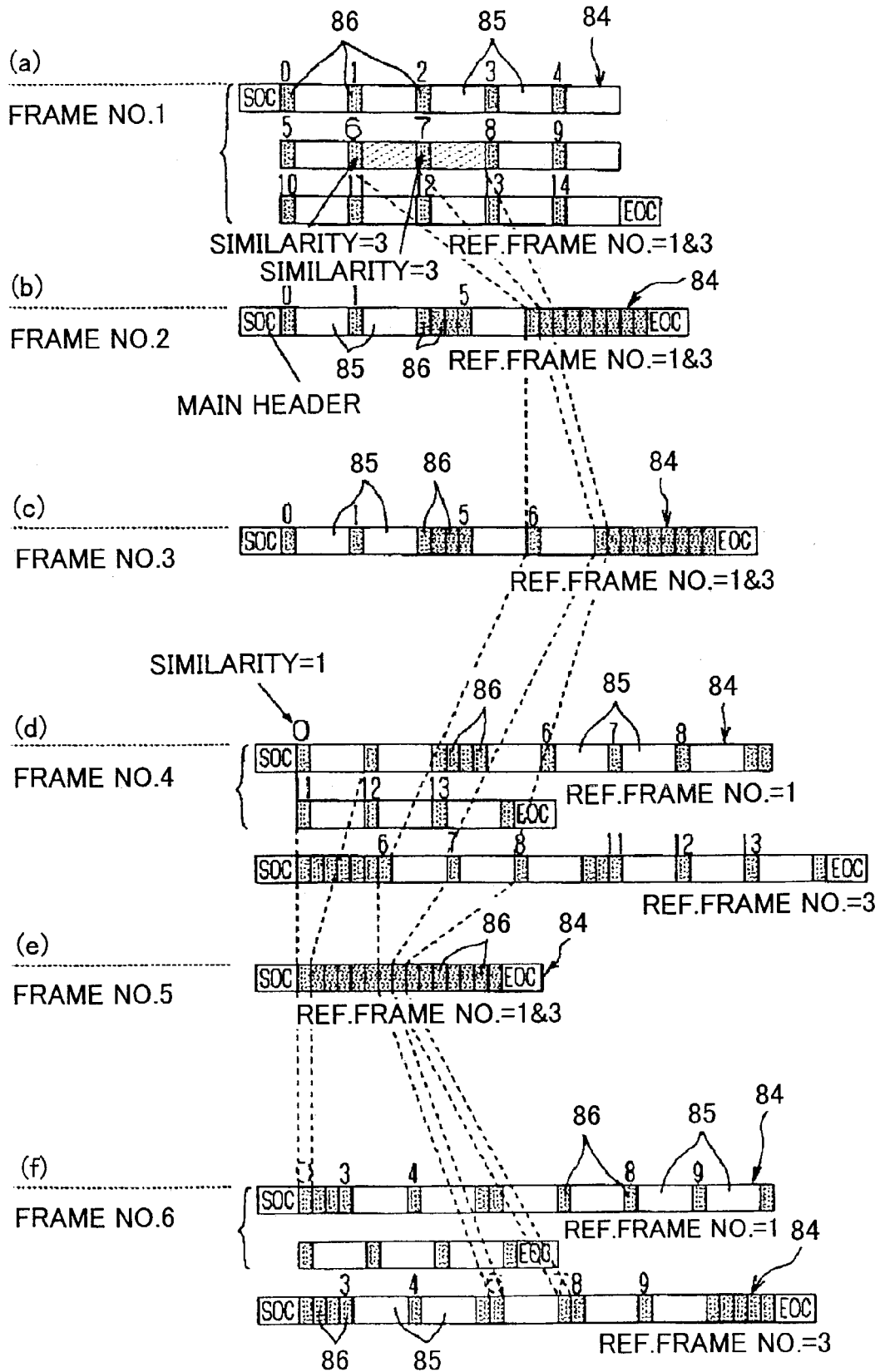
FIG. 14 is a diagram for explaining the processing which is executed by the image recording apparatus.

FIG. 14 is a diagram for explaining how the codestream transform device 5 for expansion actually restores the code data of the reduced image range based on the similarity between the frames.

The number of the preceding frames referred back to is now set to 1 (minimum) and the tile 82 of No. 0 of the 6th frame (FIG. 14(f)) is observed. There is the 4th frame of No. 1 to which the code data of the image range is left behind. Therefore, the code data inserted by the restoration is the code data of the tile 82 of No. 0 in the 4th frame.

Moreover, the number of the preceding frames referred back to is set to 3, and the tile 82 of No. 6 of the 6th frame (FIG. 14(f)) is observed. The frame of No. 1 to which the code data of the image range is left behind is the 1st frame of three frames ago (FIG. 14(a)). Therefore, the code data inserted by the restoration is the code data of the tile 82 of No. 6 of the 1st frame.

Similarly the number of the preceding frames referred back to is set to 3, and the No. 7 tile 82 of the 6th frame (FIG. 14(*f*)) is observed. The frame of No. 1 to which the code data of the image range is left behind is the 1st frame of two frames ago (FIG. 14(*a*)). Therefore, the code data inserted by the restoration becomes the code data of the tile 82 of No. 7 of the 1st frame.

Figure 15:
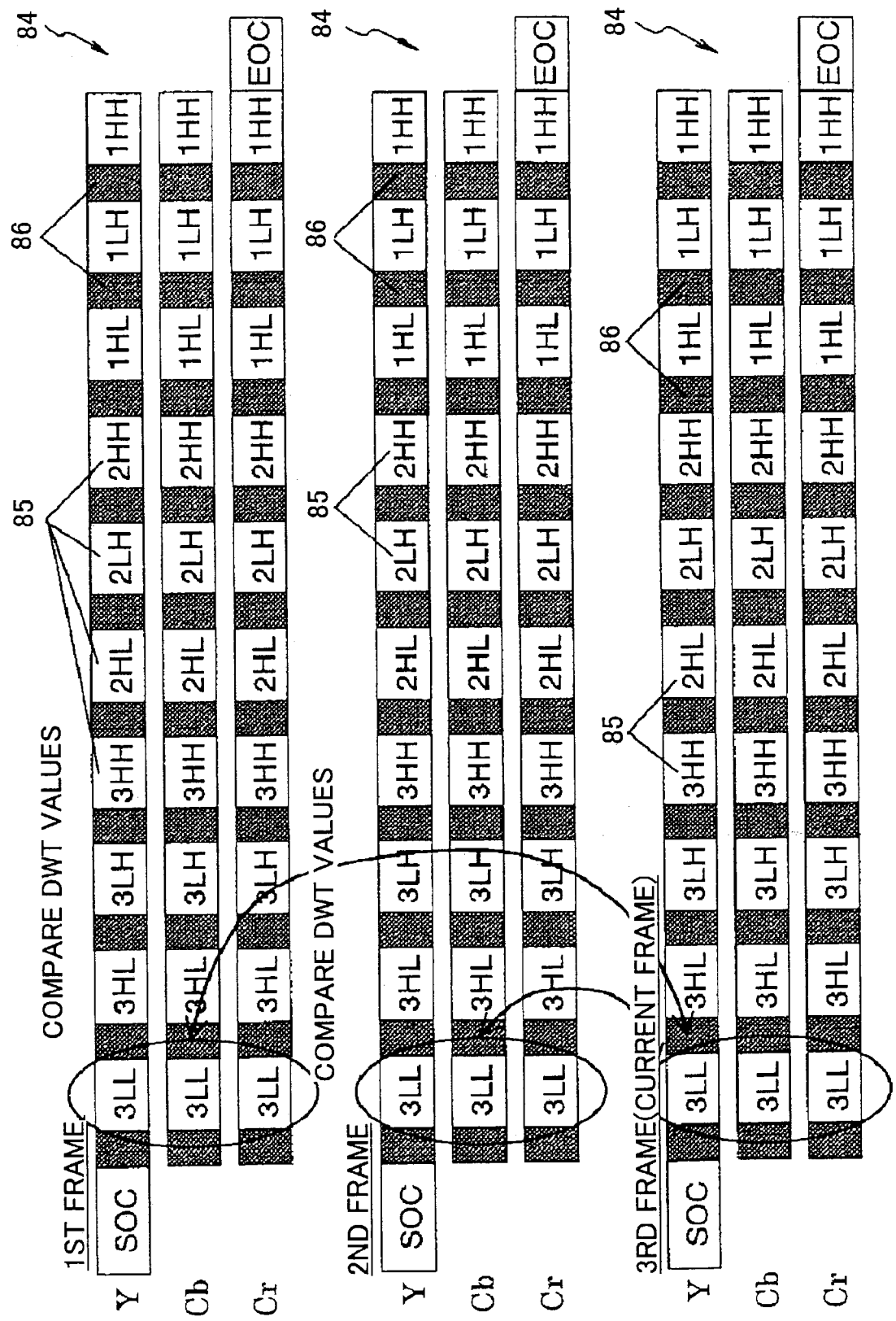
FIG. 15 is a diagram for explaining the processing which is executed by the image recording apparatus.

Next, the processing which detects correlation between the frames by the comparison unit 56*a* will be explained. FIG. 15 is a diagram for explaining this processing.

The codestream for the three continuous frames is put in order and shown in FIG. 15. Each codestream includes the three components of YUV. The number of decomposition levels is 3.

As shown in FIG. 15, the wavelet coefficients of the 3LL sub band are compared between the frames. When the digital pixel value of the former image has the depth of 8 bits for each pixel, the wavelet coefficients also have the value of the 8 bits for each pixel.

And the coefficients of 3LL are compared, and when the result does not exceed the predetermined threshold value, it is made not to choose the current frame as the input image.

According to the present invention, the threshold value can be set up arbitrarily. For example, if the setting of the threshold value is arranged in the gradually falling inclination, all bit coincidence, 4 lower-position bit coincidence, 2 lower-position bit coincidence, etc. can be considered.

Moreover, according to the present invention, it is unnecessary that the components to be compared are all the YUV(s) components, and it may be limited only to Y component.

In the above-described monitoring camera system 1, the image recording apparatus 10*a* is provided to cancel the redundancy of the compressed image data in case there is no motion of the image between the frames by using the codestream transform device 4 after carrying out compression coding in the standard data format of the Motion-JPEG2000 method by the image compression device 3, the codestream after processing is simply convertible for the standard data format of the Motion-JPEG2000 method only by compensating the reduced code data by using the codestream transform device 4.

Moreover, since it can also leave the data format of the standard of the Motion-JPEG2000 method with the data still in the state after processing by the image compression device 3, flexibility is high and can generate the codestream, which can be easily used by a standard system (image compression device 3) in which the Motion-JPEG2000 method is adopted.

Moreover, the image reproducing apparatus 10*b* can receive the codestream which is aimed at the canceling of the redundancy of the image data in case there is no motion of the image between the frames after carrying out compression coding in the data format of the Motion-JPEG2000 method by the image recording apparatus 10*a*, and can return it to the data format of the Motion-JPEG2000 method by the codestream transform device 5.

Furthermore, it can elongate to the original image data with the image decompression device 6, the codestream can be expanded by using a standard system (image decompression device 6) in which the Motion-JPEG2000 method is adopted.

As shown in FIG. 8, the codestream transform device 4 is equipped with the reference-frame change unit 58.

This reference-frame change unit 58 can change the number of the preceding frames, which are referred to by the comparison unit 56*a*, according to the user's selection.

Moreover, the reference-frame change unit 58 can change the range, the color component, and the sub band of the image in which the frames are compared by the comparison unit 56*a*, i.e., the threshold of the correlation coefficient value, and the coefficient.

Therefore, the amount of reduction of the code data can be adjusted, which enables the intention of the user to reflect the results.

For example, the threshold of the correlation coefficient value is used in order that change of the motion of the video may leave only the frame of the large scene when the correlation coefficient value is smaller than the threshold as mentioned above.

If the threshold 1 with the large value is used when the correlation coefficient value carries out time change as shown in FIG. 22A, the frame left behind will increase (see FIG. 22B).

If the threshold 2 with the small value is used, the frame left behind will decrease (see FIG. 22C).

Then, the user can set the threshold as the optimal value according to the bandwidth of the transmission medium, or the memory size of the external codestream storage device 9.

In this case, it is possible to be made to carry out as, as for change, the codestream has inputted the contents of comparison by the comparison unit 56*a* in the reference-frame change unit 58 into the codestream transform device 4 for compression.

Figure 16:
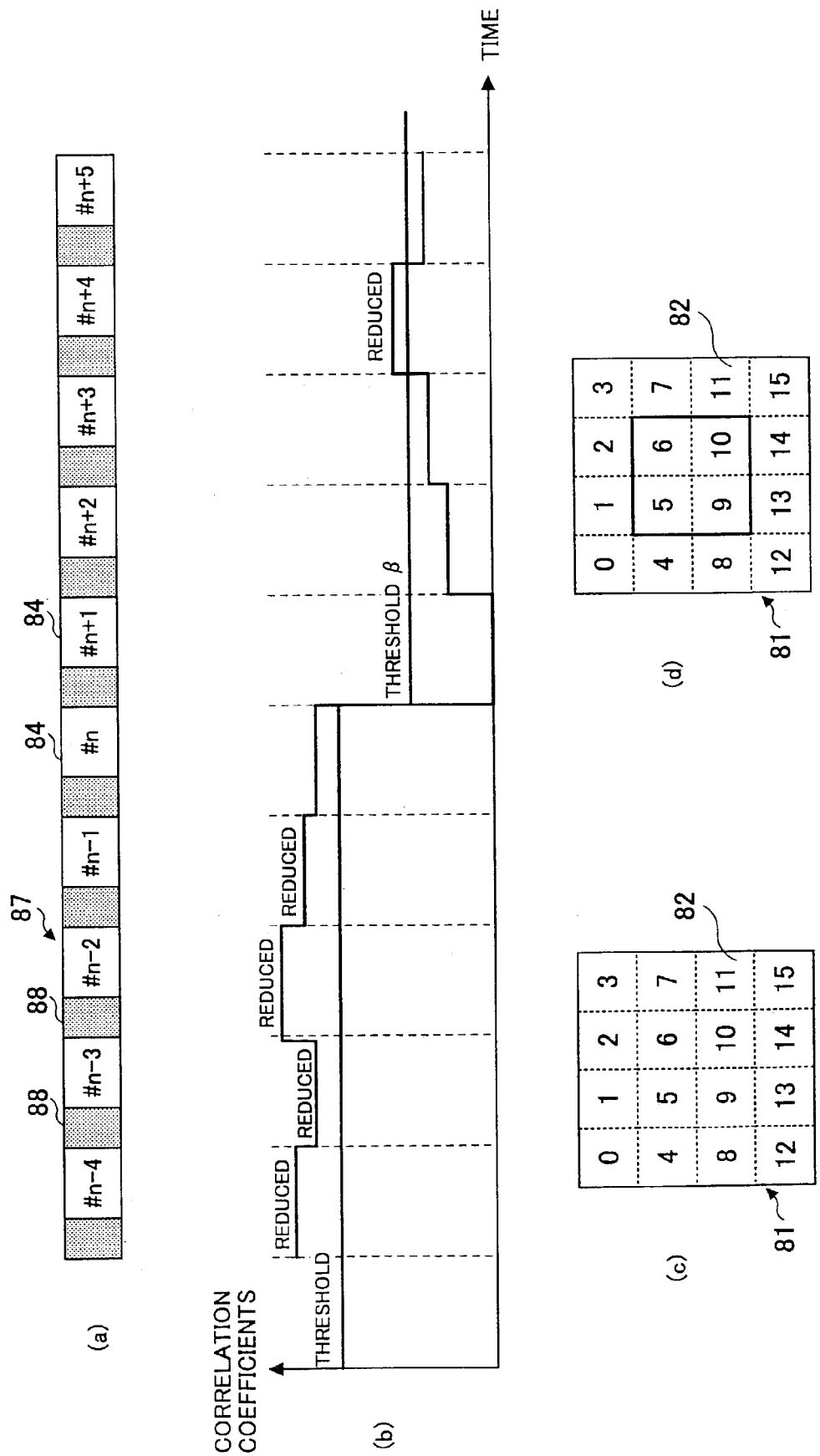
FIG. 16 is a diagram for explaining the processing which is executed by the reference-frame change unit.

FIG. 16 shows an example of this processing. As shown in FIG. 16(*a*), the codestream 87 includes the code data 84 of each frame, and the frame header 88.

And time change of the above-mentioned correlation coefficient of each frame in this codestream 87 is shown in FIG. 16(*b*).

The image area 81 for each frame is divided into sixteen 16 tiles 82 (FIGS. 16(*c*), (*d*)).

The conditions of comparison between the frames are changed between the n-th frame and the (n+1)-th frame.

The respective conditions before and after change are made into the condition A and the condition B.

The condition A before change, the range to compare is made into all the image area 81 (FIG. 16(*c*)), and the threshold to the correlation coefficient value is set up highly (threshold α in FIG. 16(*b*)).

However, the image data contents presuppose that it becomes clear that the circumference unit of the image has comparatively few motions, and the change for every frame is large only in the central range of the image.

In this case, the condition A can be changed to the condition B.

On this condition B, the comparison range is limited to the four tiles 82 of No. 5, No. 6, No. 9, and No. 10, which exist near the center of the image (FIG. 16(*d*)), and the threshold is also made low compared with the condition A (threshold β in FIG. 16(*b*)).

Consequently, in the case of the condition B, it comes to be able to perform reduction of the amount of code data in the light of high quality of image, which is different from the case of the condition A.

The codestream inputted into the codestream transform devices 4 and 5 may not be normally transmitted due to a communication error etc.

Figure 17:
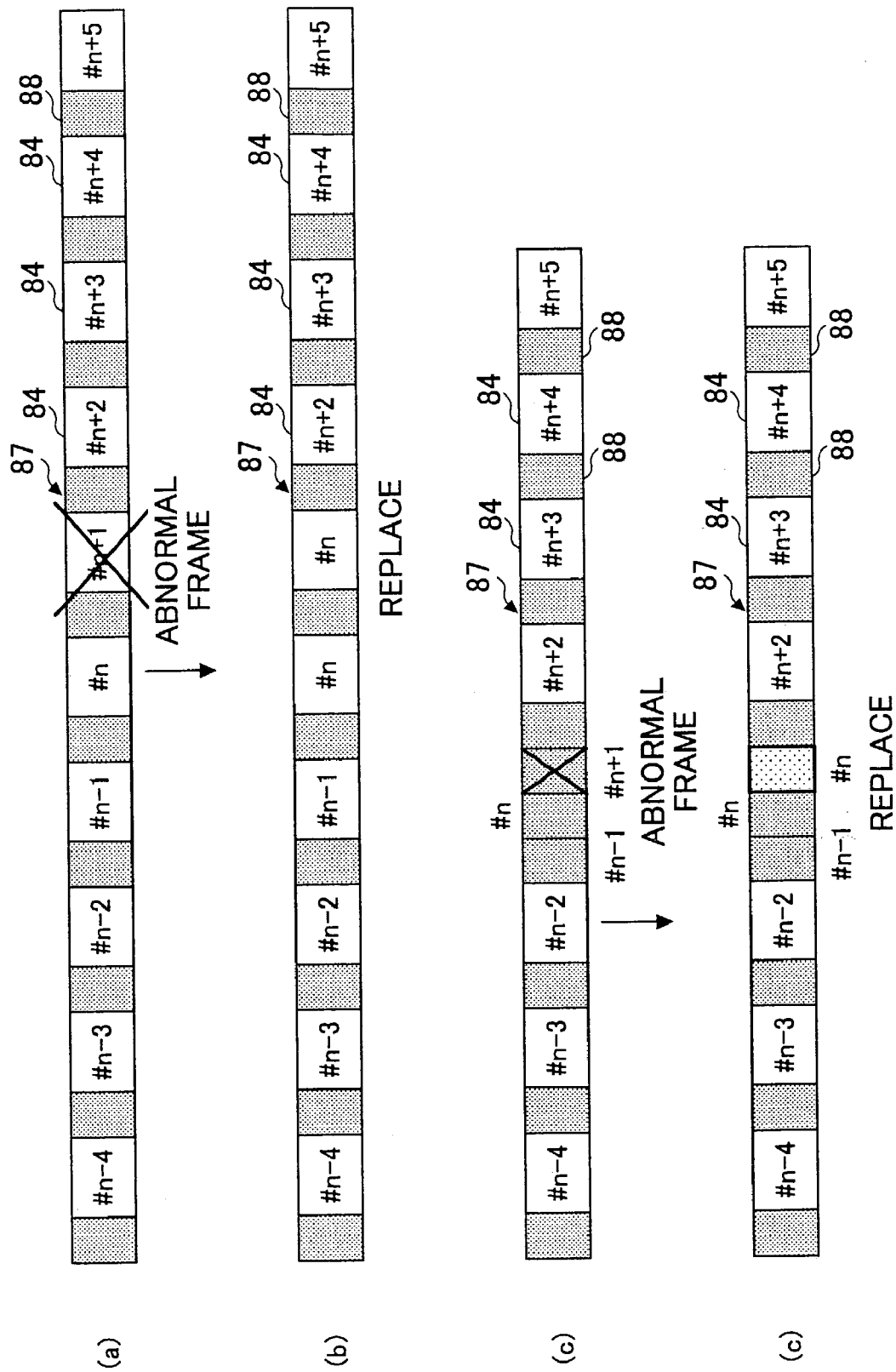
FIG. 17 is a diagram for explaining the processing which is executed by the replacement unit.

A description will now be given of the solution in this case with reference to FIG. 17. FIG. 17 shows the processing which is executed by the alternative unit or alternative processing in the image processing apparatus of the present invention.

In the codestream of FIG. 17(a), the (n+1)-th frame is missing due to the abnormality at the time of image input.

Then, with the codestream input units 51 and 61 of the codestream transform devices 4 and 5, the code data 84 of the n-th frame, preceding the (n+1)-th frame, is permuted by the part which has suffered a loss (FIG. 17(b)).

When the code data 84 of a defective frame has only the header 88, the code data 84 of the preceding frame is permuted by the part which has suffered a loss.

In the example of FIG. 17(c), the codestream of the (n+1)-th frame which becomes only by the header 88 is missing.

As shown in FIG. 17(d), the code data 84 of the n-th frame is permuted by the part which has suffered a loss.

The processing described above corresponds to the alternative unit or alternative processing in the image processing apparatus of the present invention.

Thus, even if a part of codestream is lost, the codestream can be restored in alternative by compensating the code data of the frame preceding the frame of concern.

Figure 18:
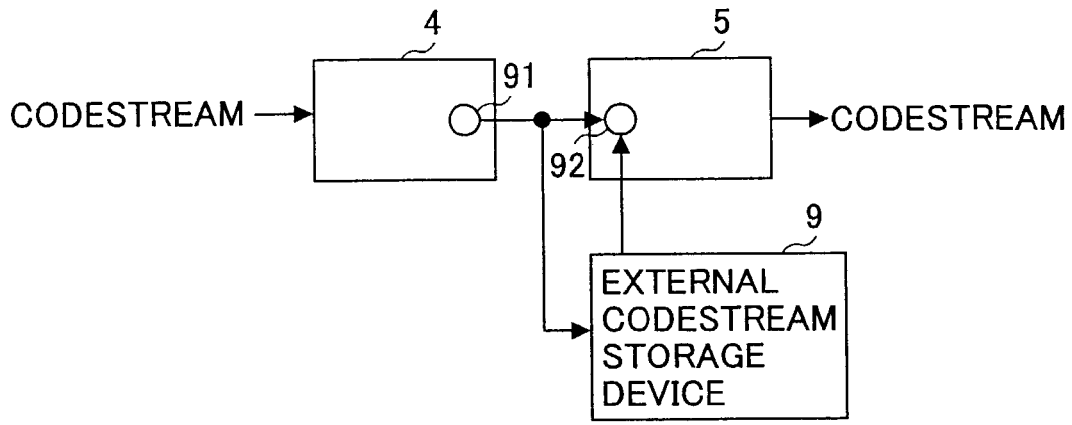
FIG. 18 is a diagram for explaining the rearrangement of the codestream.

It is possible to make the packet scramble function include in the codestream transform devices 4 and 5, as shown in FIG. 18.

Before expanding the codestream for the packet scramble unit 91 which can rearrange arbitrarily the order of packets which constitute the codestream in the data-entry unit of the codestream transform device 5 for expansion on the other hand, the packet descramble unit 92 which can rearrange correctly the order of packets which constitute the codestream of concern are respectively formed in the output unit of the data of the codestream transform device 4 for compression.

The information about the scramble in the packet scramble unit 91 is described to the header of the codestream, and this information is read from the header of the codestream at the time of the descrambling of the packets by the packet descramble unit 92.

The codestream is stored in the external codestream storage device 9 in the state where it is scrambled.

The function of packet scramble processing is provided by the packet descramble unit 92, and the function of packet descramble processing is realized by the packet scramble unit 91.

In the above-mentioned embodiment, the present invention is applied to the monitoring camera system 1. However, the present invention is not limited to this embodiment. For example, the image reproducing apparatus 10b of the present invention may be applied to various information processing devices, such as a personal computer (PC), a personal digital assistant (PDA) and a cellular phone.

Figure 21:
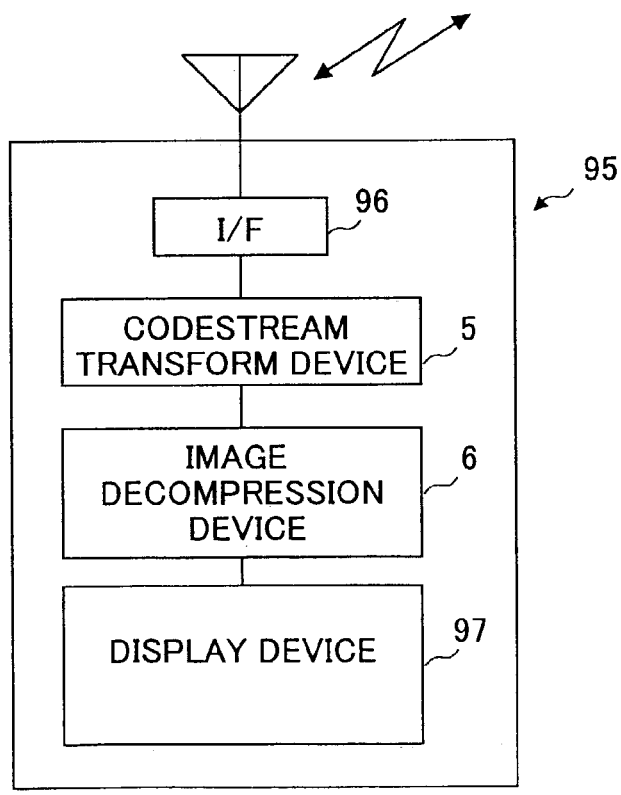
FIG. 21 is a block diagram showing the composition of an information processing device in another preferred embodiment of the present invention.

FIG. 21 shows the composition of an information processing device in another preferred embodiment of the present invention.

In FIG. 21, the elements that are essentially the same as corresponding elements in FIG. 9 are designated by the same reference numerals, and a description thereof will be omitted.

The information processing device 95 of FIG. 21 comprises a communication interface (I/F) 96, the codestream transform device 5, the image decompression device 6, and a display device 97.

The codestream of image data of a motion picture which is produced by carrying out a compression coding of wavelet coefficients as mentioned above is received at the input of the information processing device 95 through the communication interface 96. The received codestream is expanded to the original image data by using the codestream transform device 5 and the image decompression device 6 as described above. The image data after the expansion of the codestream is displayed by the display device 97 on the information processing device 95.

When applying the present invention to the information processing device 95 of FIG. 21, the codestream can also be easily expanded by using a standard system in which the Motion-JPEG2000 method is adopted.

In the present embodiment, when the order of packets in the received codestream is rearranged by the packet scramble unit 91, the packet descramble unit 92 may be provided in the information processing device 95. The information of the rearrangement for the codestream is also received with the header of the codestream, and the order of packets, which constitute the codestream, can be rearranged correctly to the original order by using the packet descramble unit 92.

According to the image processing apparatus of the present invention, it is possible to change the codestream after processing into the data format of the Motion-JPEG2000 method simply only by compensating the reduced code data by the codestream transform device. Moreover, it can also leave the data format of the standard of the Motion-JPEG2000 method with the data in the state after the processing by the image compression device.

Flexibility is high, and it is possible to generate the codestream which can be easily used by a standard system in which the Motion-JPEG2000 method is adopted.

According to the present invention, it is possible to easily expand the codestream using a standard system in which the Motion-JPEG2000 method is adopted, the codestream being aimed at the reduction of the redundancy of the image data in case there is no motion of the image between the frames, after carrying out compression coding in the data format of the Motion-JPEG2000 method.

Accordingly, it is possible to cancel the redundancy of the image data in case there is no motion of the image between the frames in the image processing apparatus according to the present invention by comparing with the threshold value the similarity of wavelet coefficients between a current frame and a preceding frame in the codestream.

The present invention is not limited to the above-described embodiments, and variations and modifications may be made without departing from the scope of the present invention.

Further, the present invention is based on Japanese priority applications No. 2002-126423, filed on Apr. 26, 2002, the entire contents of which are hereby incorporated by reference.

What is claimed is:

1. An image processing apparatus which processes image data of a motion picture having a number of frames, each frame being divided into one or a plurality of rectangular portions, the image processing apparatus comprising:

an image compression device performing a discrete wavelet transform of pixel values for each rectangular portion to produce wavelet coefficients, and performing a hierarchical compression coding of the wavelet coefficients for each rectangular portion so that a codestream is produced; and a codestream transform device provided to reduce an amount of code data in the codestream after the compression coding, the codestream transform device comprising:

a syntax analysis unit analyzing header information of the codestream;

a comparison unit determining a similarity between a current frame and a preceding frame in the codestream based on a result of the analysis of the syntax analysis unit; and a codestream generating unit deleting code data of a corresponding rectangular portion of the current frame when the similarity is larger than a given threshold value.

2. The image processing apparatus according to claim 1 wherein the comparison unit is provided to determine a similarity of wavelet coefficients between the current frame and the preceding frame and compare the determined similarity with the threshold value.

3. The image processing apparatus according to claim 2 wherein the codestream transform device comprises a decoding unit and an inverse quantization unit, the decoding unit and the inverse quantization unit being provided to produce wavelet coefficients from the codestream, the wavelet coefficients being supplied to the comparison unit.

4. The image processing apparatus according to claim 2 wherein the codestream transform device comprises a packet scramble unit which arbitrarily rearranges the order of packets, constituting the codestream in which the amount of code data is reduced by the codestream generating unit, and describes information of the rearrangement to a header of the codestream.

5. The image processing apparatus of claim 2 wherein the codestream transform device comprises a reference-frame change unit which changes an object of comparison for each of the current frame and the preceding frame being compared by the comparison unit.

6. The image processing apparatuses according to claim 5 wherein the reference-frame change unit is provided to change the threshold value.

7. The image processing apparatuses according to claim 5 wherein the reference-frame change unit is provided to change a range for each of the current frame and the preceding frame being compared by the comparison unit.

8. The image processing apparatuses according to claim 5 wherein the reference-frame change unit is provided to change a color component for each of the current frame and the preceding frame being compared by the comparison unit.

9. The image processing apparatuses according to claim 5 wherein the reference-frame change unit is provided to change the preceding frame which is compared with the current frame by the comparison unit, to another preceding frame.

10. The image processing apparatuses according to claim 5 wherein the reference-frame change unit is provided to change a sub band in which both the frames compared by the comparison unit.

11. An image processing apparatus which processes image data of a motion picture having a number of frames, each frame being divided into one or a plurality of rectangular portions, the image processing apparatus comprising:

a codestream transform device receiving a first codestream after compression coding of image data, the first codestream having code data reduced by comparison between frames in the first codestream, and the codestream transform device compensating for the reduced code data so that a second codestream in which the reduced code data is restored is produced; and a wavelet expansion unit performing an inverse discrete wavelet transform of the second codestream for each rectangular portion to generate wavelet coefficients, the codestream transform device comprising:

a syntax analysis unit analyzing header information of the first codestream; and a codestream generating unit inserting code data of a preceding frame into a current frame in the first codestream when the current frame is detected as containing a deletion code data based on a result of the analysis of the syntax analysis unit, so that the second codestream in which the reduced code data is restored is produced.

12. The image processing apparatus according to claim 11 wherein the codestream transform device comprises a packet descramble unit which reads information of rearrangement of the order of packets from a header of the first codestream, and rearranges the order of packets, constituting the first codestream before the restoration of the reduced code data, in original order according to the read information of the rearrangement.

13. The image processing apparatus according to claim 11 wherein the codestream transform device is provided to compensate for a missing code data of a defective frame in the first codestream by inserting in the defective frame a code data of a frame preceding the defective frame.

14. An image recording apparatus including an image input device and an image processing apparatus, the image input device supplying image data of a motion picture having a number of frames, to the image processing apparatus, the image processing apparatus processing the image data, each frame being divided into one or a plurality of rectangular portions, the image processing apparatus comprising:

an image compression device performing a discrete wavelet transform of pixel values for each rectangular portion to produce wavelet coefficients, and performing a hierarchical compression coding of the wavelet coefficients for each rectangular portion so that a codestream is produced; and a codestream transform device provided to reduce an amount of code data in the codestream after the compression coding, the codestream transform device comprising:

a syntax analysis unit analyzing header information of the codestream;

a comparison unit determining a similarity between a current frame and a preceding frame in the codestream based on a result of the analysis of the syntax analysis unit; and a codestream generating unit deleting code data of a corresponding rectangular portion of the current frame when the similarity is larger than a given threshold value.

15. An image reproducing apparatus including an image processing apparatus and an image display device, the image processing apparatus processing image data of a motion picture having a number of frames, each frame being divided into one or a plurality of rectangular portions, the image display unit displaying a reconstructed motion picture with the image data processed by the image processing apparatus, the image processing apparatus comprising:

a codestream transform device receiving a first codestream after compression coding of image data, the first codestream having code data reduced by comparison between frames in the first codestream, and compensating for the reduced code data so that a second codestream in which the reduced code data is restored is produced; and a wavelet expansion unit performing an inverse discrete wavelet transform of the second codestream for each rectangular portion to generate wavelet coefficients, the codestream transform device comprising:
a syntax analysis unit analyzing header information of the first codestream; and
a codestream generating unit inserting code data of a preceding frame into a current frame in the first codestream when the current frame is detected as containing a deletion code data based on a result of the analysis of the syntax analysis unit, so that the second codestream in which the reduced code data is restored is produced.

16. A camera system which includes an image recording apparatus and an image reproducing apparatus,
the image recording apparatus including an image input device and a first image processing apparatus, the image input device supplying image data of a motion picture having a number of frames, to the first image processing apparatus, the first image processing apparatus processing the image data, each frame being divided into one or a plurality of rectangular portions, the first image processing apparatus comprising:
an image compression device performing a discrete wavelet transform of pixel values for each rectangular portion to produce wavelet coefficients, and performing a hierarchical compression coding of the wavelet coefficients for each rectangular portion so that a codestream is produced; and
a first codestream transform device provided to reduce an amount of code data in the codestream after the compression coding, the first codestream transform device comprising:
a first syntax analysis unit analyzing header information of the codestream;
a comparison unit determining a similarity between a current frame and a preceding frame in the codestream based on a result of the analysis of the syntax analysis unit; and
a first codestream generating unit deleting code data of a corresponding rectangular portion of the current frame when the similarity is larger than a given threshold value,
the image reproducing apparatus including a second image processing apparatus and an image display device, the second image processing apparatus processing the image data supplied from the first image processing apparatus, the image display unit displaying a reconstructed motion picture with the image data processed by the second image processing apparatus, the second image processing apparatus comprising:
a second codestream transform device receiving a first codestream after the compression coding, the first codestream having code data reduced by comparison between frames in the first codestream, and the second codestream transform device compensating for the reduced code data so that a second codestream in which the reduced code data is restored is produced; and
a wavelet expansion unit performing an inverse discrete wavelet transform of the second codestream for each rectangular portion to generate wavelet coefficients,
the second codestream transform device comprising:
a second syntax analysis unit analyzing header information of the first codestream; and
a second codestream generating unit inserting code data of a preceding frame into a current frame in the first codestream when the current frame is detected as containing a deletion code data based on a result of the analysis of the second syntax analysis unit, so that the second codestream in which the reduced code data is restored is produced.

17. A computer program embodied in a computer-readable medium for causing a computer to execute an image processing method to process image data of a motion picture having a number of frames, each frame being divided into one or a plurality of rectangular portions, the method comprising steps of:
performing a discrete wavelet transform of pixel values for each rectangular portion to produce wavelet coefficients;
performing a hierarchical compression coding of the wavelet coefficients for each rectangular portion so that a codestream is produced;
analyzing header information of the codestream;
determining a similarity between a current frame and a preceding frame in the codestream based on a result of the analysis; and
deleting code data of a corresponding rectangular portion of the current frame when the similarity is larger than a given threshold value, so that an amount of code data in the codestream after the compression coding is reduced.

18. The computer program according to claim 17 wherein the determining step is provided to determine a similarity of wavelet coefficients between the current frame and the preceding frame and compare the determined similarity with the threshold value.

19. The computer program according to claim 18 wherein the determining step includes steps of:
decoding code data in the codestream for each rectangular portion; and
performing an inverse quantization of the decoded data to produce wavelet coefficients for each rectangular portion.

20. The computer program according to claim 18 wherein the method further comprises steps of:
arbitrarily rearranging the order of packets, constituting the codestream in which the amount of code data is reduced; and
describing information of the rearrangement to a header of the codestream.

21. The computer program according to claim 18 wherein the method further comprises a step of changing an object of comparison for each of the current frame and the preceding frame compared in the determining step.

22. A computer program embodied in a computer-readable medium for causing a computer to execute an image processing method to process image data of a motion picture having a number of frames, each frame being divided into one or a plurality of rectangular portions, the method comprising steps of:
receiving a first codestream after compression coding of image data, the first codestream having code data reduced by comparison between frames in the first codestream;
compensating for the reduced code data so that a second codestream in which the reduced code data is restored is produced; and
performing an inverse discrete wavelet transform of the second codestream for each rectangular portion to generate wavelet coefficients, wherein the compensating step comprises steps of:
analyzing header information of the first codestream; and
inserting code data of a preceding frame into a current frame in the first codestream when the current frame is detected as containing a deletion code data based on a result of the analysis, so that the second codestream in which the reduced code data is restored is produced.

23. The computer program according to claim 22 wherein the method further comprises steps of:

reading information of rearrangement of the order of packets from a header of the first codestream; and rearranging the order of packets, constituting the first codestream before the restoration of the reduced code data, in original order according to the read information of the rearrangement.

24. The computer program according to claim 22 wherein the method further comprises a step of compensating for a missing code data of a defective frame in the first codestream by inserting in the defective frame a code data of a frame preceding the defective frame.

25. A computer-readable storage medium storing a computer program embodied therein for causing a computer to execute an image processing method to process image data of a motion picture having a number of frames, each frame being divided into one or a plurality of rectangular portions, the method comprising steps of:

performing a discrete wavelet transform of pixel values for each rectangular portion to produce wavelet coefficients;

performing a hierarchical compression coding of the wavelet coefficients for each rectangular portion so that a codestream is produced;

analyzing header information of the codestream after the compression coding;

determining a similarity between a current frame and a preceding frame in the codestream based on a result of the analysis; and deleting code data of a corresponding rectangular portion of the current frame when the similarity is larger than a given threshold value, so that an amount of code data in the codestream after the compression coding is reduced.

* * * * *